(12) United States Patent
Brown et al.

(10) Patent No.: US 7,657,517 B2
(45) Date of Patent: Feb. 2, 2010

(54) SERVER FOR SYNCHRONIZATION OF FILES

(75) Inventors: David K. Brown, Carmel Valley, CA (US); Thomas A. Rolander, Pacific Grove, CA (US); Robert D. Silberstein, Monterey, CA (US); Josef Wein, Yokohama (JP)

(73) Assignee: Novell, Inc., Provo, UT (US)

( * ) Notice: Subject to any disclaimer, the term of this patent is extended or adjusted under 35 U.S.C. 154(b) by 401 days.

(21) Appl. No.: 11/327,742

(22) Filed: Jan. 5, 2006

(65) Prior Publication Data

US 2006/0112150 A1 May 25, 2006

Related U.S. Application Data

(63) Continuation of application No. 10/098,985, filed on Mar. 15, 2002, now Pat. No. 7,035,847.

(60) Provisional application No. 60/276,369, filed on Mar. 16, 2001.

(51) Int. Cl.
*G06F 17/30* (2006.01)

(52) U.S. Cl. .................. 707/4; 707/3; 707/2; 707/1

(58) Field of Classification Search ......... 707/200–201, 707/203
See application file for complete search history.

(56) References Cited

U.S. PATENT DOCUMENTS

| | | | |
|---|---|---|---|
| 4,432,057 A | 2/1984 | Daniell et al. |
| 5,410,697 A | 4/1995 | Baird et al. |
| 5,446,888 A | 8/1995 | Pyne |
| 5,452,448 A | 9/1995 | Sakuraba et al. |
| 5,586,310 A | 12/1996 | Sharman |
| 5,721,907 A | 2/1998 | Pyne |
| 5,826,253 A | 10/1998 | Bredenberg |
| 5,884,325 A | 3/1999 | Bauer et al. |
| 5,978,805 A | 11/1999 | Carson |
| 6,029,175 A | 2/2000 | Chow et al. |
| 6,052,724 A | 4/2000 | Willie et al. |
| 6,158,008 A | 12/2000 | Maria et al. |
| 6,163,856 A | 12/2000 | Dion et al. |
| 6,192,365 B1 | 2/2001 | Draper et al. |
| 6,202,085 B1 | 3/2001 | Benson et al. |
| 6,233,589 B1 | 5/2001 | Balcha et al. |

(Continued)

FOREIGN PATENT DOCUMENTS

WO  WO02/075539 A3  9/2005

OTHER PUBLICATIONS

Satyanarayanan M et al: "Coda: A Highly Available File System for a Distributed Workstation Environment," IEEE Transactions on Computers, vol. 39, No. 4, Apr. 1990, pp. 447-459.

(Continued)

*Primary Examiner*—Yicun Wu
(74) *Attorney, Agent, or Firm*—Marger Johnson & McCollom PC

(57) ABSTRACT

A server stores files. Distributed clients access the server, to learn about changes made to the files on the server, and to push local changes of the files onto the server. A synchronization application is used to synchronize the clients and server, synchronizing metadata and selected files.

42 Claims, 29 Drawing Sheets

U.S. PATENT DOCUMENTS

| | | | |
|---|---|---|---|
| 6,308,201 | B1 | 10/2001 | Pivowar et al. |
| 6,317,754 | B1 | 11/2001 | Peng |
| 6,321,236 | B1 | 11/2001 | Zollinger et al. |
| 6,339,787 | B1 | 1/2002 | Yohe et al. |
| 6,345,308 | B1 | 2/2002 | Abe |
| 6,412,017 | B1 | 6/2002 | Straube et al. |
| 6,470,329 | B1 | 10/2002 | Livschitz |
| 6,516,337 | B1 | 2/2003 | Tripp et al. |
| 6,574,657 | B1 * | 6/2003 | Dickinson .................. 709/203 |
| 6,581,074 | B1 | 6/2003 | Wong et al. |
| 6,681,252 | B1 | 1/2004 | Schuster et al. |
| 6,725,239 | B2 | 4/2004 | Sherman et al. |
| 2002/0010807 | A1 | 1/2002 | Multer et al. |

OTHER PUBLICATIONS

Satyanarayanan M: "A Survey of Distributed File Systems," Annual Review of Computer Science, vol. 4, Feb. 1989, pp. 73-104.

Balasubramaniam S et al: "What is a File Synchronizer?", Mobicom '98, Proceedings of the 4th Annual ACM/IEEE International Conference on Mobile Computing and Networking. Dallas, TX, Oct. 25-30, 1998, Annual ACM/IEEE International Conference on Mobile Computing and Networking, New York, NY: ACM Oct. 25, 1998, pp. 98-108.

Andrew Tridell et al: "The Rsync Algorithm," Nov. 9, 1998, pp. 1-10, Retrieved from the Internet: http://samba.anu.edu.au/rsync/tech_report/node2.html.

Zadok E: "Stackable File Systems as a Security Tool," Dec. 1999, pp. 1-19, Retrieved from the Internet: <URL:http://www.cs.columbia.edu/lezk/resea, retrieved on Jan. 21, 2003, p. 4.

Braam P. J; Nelson P. A.: "Removing Bottlenecks in Distributed Filesystems: Coda & InterMezzo as examples," Proceedings of Linux Expo 1999, Online May 1999, pp. 1-11, Retrieved from Internet: <URL:http://www-2.cs.cmu.edu/afs/cs/projec, retrived on Nov. 28, 2003, pp. 3-4 and 9.

Tichy W. F.: "RCS-A System for Version Control," Software Practice & Experience, John Wiley & Sons Ltd., Chichester, GB, vol. 15, No. 7, Jul. 1985, pp. 637-654.

Bedoll R. et al: "The Importance of Meta-Data in Mass-Storage Systems," Crisis in Mass Storage. Monterey, May 7-10, 1990, Proceedings of the Symposium on Mass Storage, New York, IEEE, vol. SYMP. 10, May 7, 1990, pp. 111-116.

"The rsync algorithm", http://samba.anu.edu.au/rsync/tech_report/node2.html, 1 page (1998).

* cited by examiner

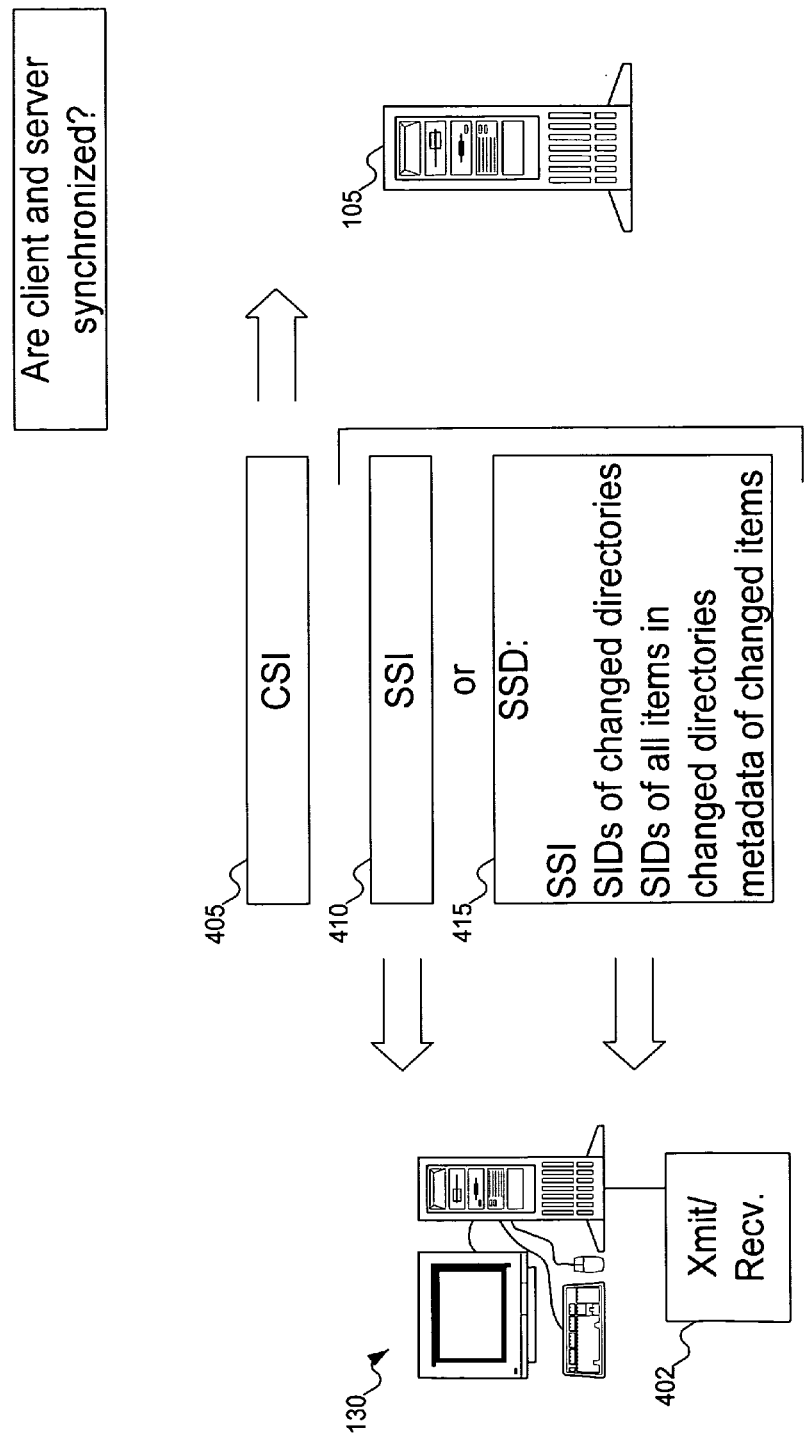

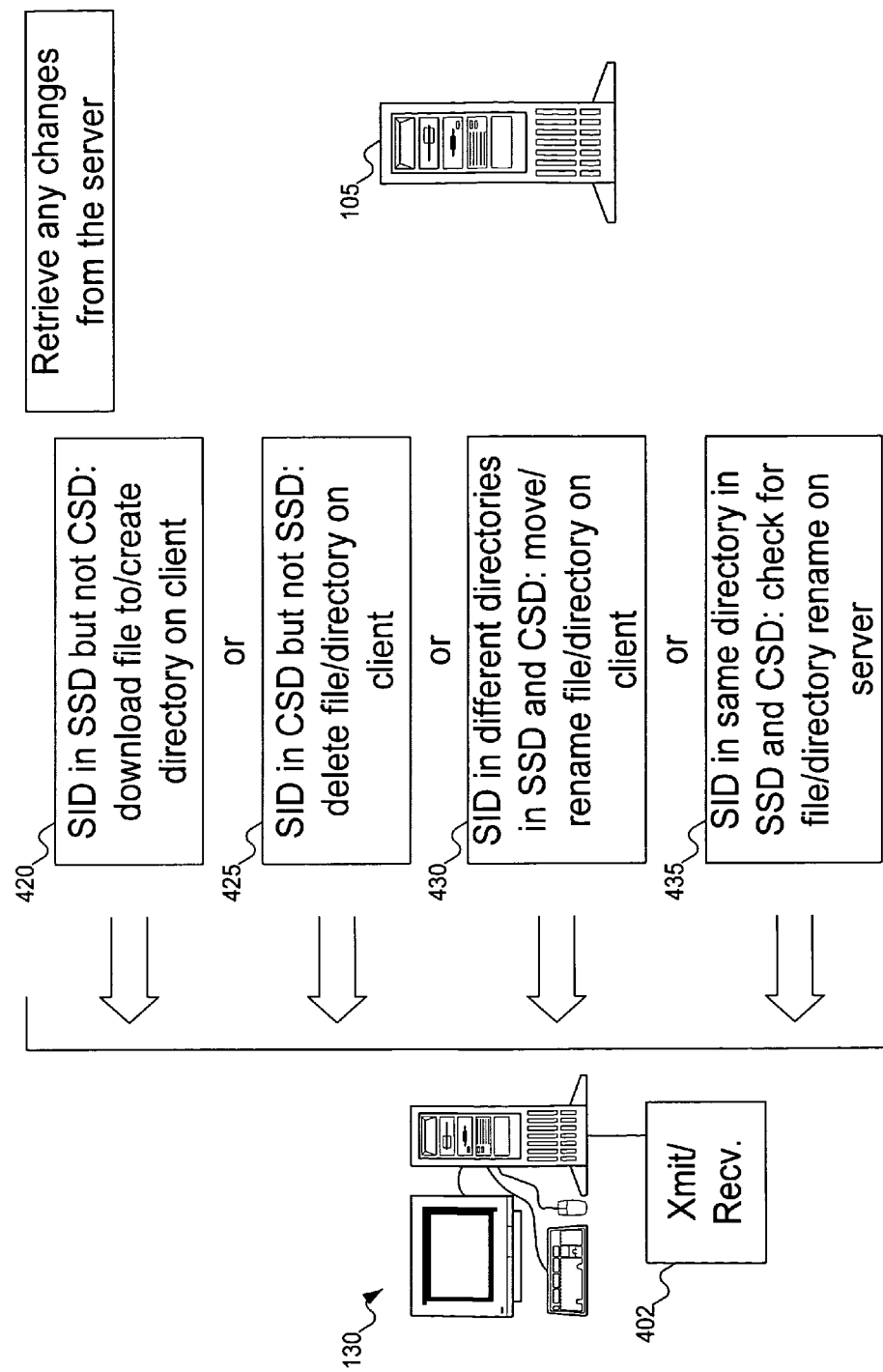

SERVER FOR SYNCHRONIZATION OF FILES

RELATED APPLICATION DATA

This application is a continuation of U.S. patent application Ser. No. 10/098,985, titled "Server for Synchronization of Files", filed Mar. 15, 2002 now U.S. Pat. No. 7,035,847 which claims the benefit of U.S. Provisional Application No. 60/276,369, filed Mar. 16, 2001, and is related to U.S. patent application Ser. No. 10/099,522, titled "Client-Server Model for Synchronization of Files," filed Mar. 15, 2002, all of which are hereby incorporated by reference.

FIELD OF THE INVENTION

This invention pertains to distributed file access, and more particularly to accessing files remotely from multiple computers and retaining changes.

BACKGROUND OF THE INVENTION

When computers first made their way into society, few people could afford a machine for themselves. At best, individuals had a single machine at work on which they could work. But as computers have become more affordable, people find themselves working with several machines. It is increasingly common for people to find themselves working on one machine at the office, a second machine at home, and having use of a portable computer when they need to have computer access while traveling.

The Internet has also effected a change on society. With the availability of low cost connections and public access points, people can access information across networks of varying sizes (local, national, global) almost anywhere they might want to.

But with the increasing number of machines a person might find himself using comes an added complexity. Since a person typically accesses the same files from the various computers, the user needs to be certain that the files he is accessing are current.

Originally, people carried files on floppy disks from one machine to the next. But the increases in file size sometimes make floppy disks impractical. And if the user forgets to bring the files with him as he moves around, or forgets to move the latest versions of the files off the computer he most recently used, the user can find himself with several versions of the files, each of which contain desired portions.

Accordingly, a need remains for a way to maintain distributed files across multiple clients, maintaining currency at each client as changes are made, to address these and other problems associated with the prior art.

SUMMARY OF THE INVENTION

The invention is a method and apparatus for synchronizing data on multiple client machines. The structure of the invention is a client/server application where the server component is a Synchronization File System (SFS) with a functional interface and metadata organization that enables efficient and reliable synchronization by the clients. The client component is a Synchronization Application (SA) that uses the server SFS to synchronize the local client data with the server. Client machines synchronize with each other by synchronizing to a common server account.

The foregoing and other features, objects, and advantages of the invention will become more readily apparent from the following detailed description, which proceeds with reference to the accompanying drawings.

BRIEF DESCRIPTION OF THE DRAWINGS

FIGS. 4A-4C show the transfer of information between the client and server of FIG. 1, according to an embodiment of the invention.

DETAILED DESCRIPTION OF THE PREFERRED EMBODIMENT

Overview of Client/Server Synchronization

Figure 1:
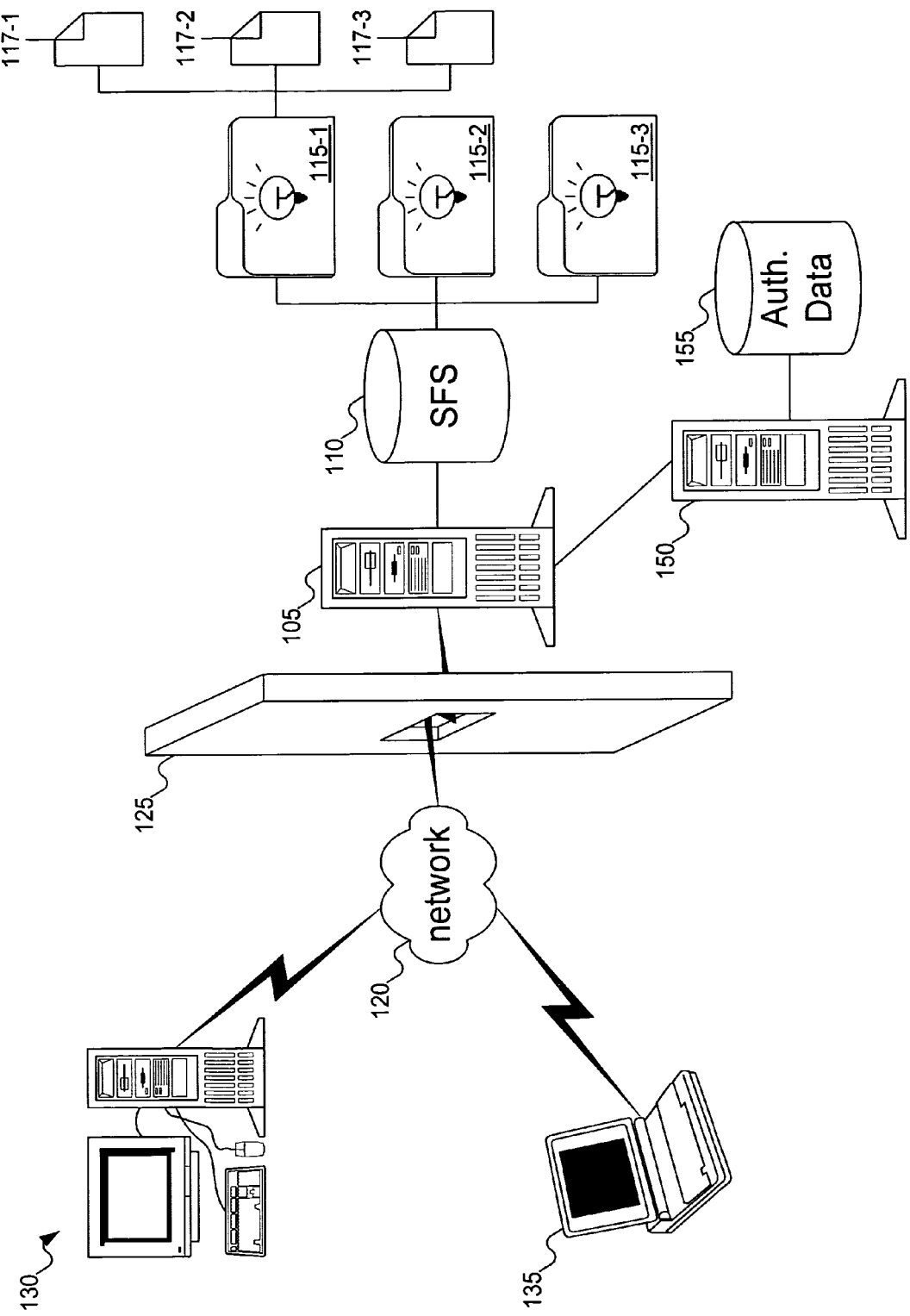
FIG. 1 shows a server with several clients accessing files stored on a server Synchronization File System on the server, according to an embodiment of the invention.

An embodiment of the invention is a client/server application that allows users to synchronize data on multiple machines. The server component is a server Synchronization File System (SFS) with a functional interface and metadata organization that enables efficient and reliable synchronization by the clients. (A glossary of acronyms can be found at the end of this document.) The client component is a client Synchronization Application (SA) that uses the server SFS to synchronize its local client data with the server. Client machines synchronize with each other by synchronizing to a common server account.

The client SA communicates with the server SFS via TCP/IP. Preferably, the client SA communicates with the server SFS using a proprietary protocol tunneled within the hypertext transport protocol (HTTP), but a person skilled in the art will recognize that other protocols can be used. Communication between the client SA and the server SFS is initiated by the client SA and responded to by the server SFS. An embodiment of the invention can maintain the security of the data by using encrypted accounts. User data is encrypted on the client by the client SA and stored encrypted on the server. The user can select whatever encryption protocol is desired. And since the data is encrypted on the client before transmission, the use of the Secure Sockets Layer (SSL) to protect the data during transmission across a potentially vulnerable network is not required.

The client/server architecture is designed to minimize the load on the server processor in order to maximize server scalability. To that end, as many processor-intensive operations as possible, such as message digest computation and comparison, data encryption and decryption, and synchronization itself, are performed by the client SA. Also, the polling mechanism used by the client SA to determine if the client is synchronized with the server is designed to require minimal processing on the server when the client and server are in sync. This is significant because as a rule only a small percentage of clients require synchronization activity at any point in time.

The client/server architecture is also designed to minimize the amount of data transmitted on the wire during the synchronization process. Preferably, only the parts of files that have changed are uploaded or downloaded when synchronizing files. The architecture also includes algorithms to minimize the amount of metadata exchanged between the server and the client during synchronization. In the common special case where the client and server are in sync, the amount of data exchanged is just a few bytes. Minimizing the amount of transmitted data is discussed further in the section below entitled "Partial Downloads and Uploads."

From the user's perspective, the synchronization process is automatic, runs in the background and requires minimal monitoring or intervention. In an embodiment of the invention, the client SA initiates synchronization on a fixed time interval. But a person skilled in the art will recognize that the client SA can use any scheduling algorithm to initiate synchronization. In addition, the user can also initiate synchronization at any time manually. The client SA monitors local file system activity within the directory (sometimes called a folder) on the client so that it can efficiently locate changes to send to the server SFS during synchronization. The client SA also monitors client file system activity to prevent synchronization from interfering with running applications on the client machine.

FIG. 1 shows a server with several clients accessing files stored on a server SFS on the server, according to an embodiment of the invention. In FIG. 1, server 105 includes server SFS 110. Server 105 includes all the typical elements of a server, such as a central processor, memory, bus, disk space, etc. Typically, server SFS 110 is installed on a hard disk drive within server 105, but a person skilled in the art will recognize other forms of media usable by server 105: for example, removable media or optical media. Stored on server SFS 110 are folders 115-1, 115-2, and 115-3. Although FIG. 1 shows only three such folders, a person skilled in the art will recognize that there can be more or fewer folders. Each of the folders is assigned to a user. Once the user has logged in, the user can access the files and directories (cumulatively called directory entries) within the folder. For example, folder 115-1 is shown with three files 117-1, 117-2, and 117-3. Again, a person skilled in the art will recognize that there can be more or fewer files in each folder, and that there can be a directory structure associated with each folder.

Server 105 is connected to a network, such as network 120. Network 120 can be a local area network (LAN), a wide area network (WAN), a global network such as the Internet, a wireless network, or any other type of network. Firewall 125 can be used to separate server 105 from network 120, protecting server 105 against unauthorized access. As mentioned above, in an embodiment of the invention, communication between the clients and server 105 is tunneled within the hypertext transport protocol (HTTP). This allows synchronization to occur even through firewalls, such as firewall 125, which normally permit HTTP data to travel relatively freely.

The term client refers to various kinds of machines that can be connected to a network. Client 130 represents an ordinary desktop computer, as might be present at a user's place of work or home. Portable computer 135 represents a notebook or laptop computer, as a user might take with him to a hotel room on business. To the extent that the client software can be installed on other types of devices, these other devices can be clients. For example, a user might use a personal digital assistant (PDA) to synchronize with server 105, if the PDA can install the client SA.

As discussed below with reference to FIG. 12, another type of client is a browser client running an applet. In a preferred embodiment, the applet runs in Java and provides direct access to a user's files in his server account, but does not provide for synchronization. (Java is a registered trademark of Sun Microsystems, Inc. in the United States and other countries.)

Server Synchronization File System

The server SFS is similar to other file systems in that it supports files and directories with familiar metadata such as name, update and create time, and file length. There are, however, significant differences. The most important difference is that the server SFS is not a "general purpose" file system but a special purpose file system designed for synchronization.

Access to the server SFS is restricted to file level operations via the protocol where new files can be uploaded, existing files can be downloaded, replaced, renamed, moved, or deleted, but an existing file cannot be modified directly. The protocol also provides directory functions to create, delete, rename, and move directories.

The server SFS supports encrypted accounts in which not only file data is encrypted but directory and file names within the server metadata are also encrypted. The server SFS metadata also contains several special fields that are used in synchronization.

The server SFS supports concurrent synchronization of a large number of clients limited only by the server's performance and bandwidth considerations. Concurrent synchronization of different user accounts is supported with no additional restrictions. On any given account, however, the server SFS enforces a single changer model in which only one client at a time can change the state of the user's server data. When multiple clients of a single user account push changes to the server concurrently, the server SFS interleaves the changes. For file uploads, a file is first uploaded to a temporary file on the server. Then, after the file data is on the server, the server SFS inserts the file and its metadata into the user's server account database in an atomic operation. Thus, multiple clients to the same account can upload data concurrently but the insert operations are interleaved.

Thus, state changes to a user's server account occur in file or directory change increments. This is a fundamental property of the server SFS. The server SFS numbers these states and assigns them a sequence number called the sync (short for synchronization) index. Synchronizing a client machine with server data that is not up to date with its server account can be viewed as the process of moving the state of the client's directory from the old server SFS state, identified by an older (lower) server sync index (SSI) value, to a new server SFS state, identified by a more recent (higher) SSI value.

The synchronization process is initiated by a client SA when it makes a sync poll call to the server, passing it the client sync index (CSI) identifying its current known state of the account. If the SSI value matches the CSI value passed in by the polling client, the client is up to date with the current state of its server account. In that case, the server SFS returns the SSI (having the same value as the CSI) back to the client. Otherwise, the server SFS returns the new higher SSI along with the server metadata information the client needs to transition its account from its current state to the server's current state.

The server SFS maintains a three-level hierarchy of sync indices (SIs) in its metadata. At the highest level, there is an account SSI field that identifies the current state of the account. This is the first value checked by the server SFS on a client poll call. If this value matches the CSI value passed in by a polling client, the client directory is up to date.

The directory sync index (DSI) fields reside at the middle level of the hierarchy. The server SFS maintains a directory table for each user account with a directory item for each user directory. Each directory item contains a DSI value associated with the last change to a file or directory within the directory. The server SFS uses this value to quickly find directories with changes that need to be pushed down to a syncing client. Directory items with DSI values greater than the value passed in by the polling client SA identify the directories with changes.

At the lowest level is the SI field that resides in each file and directory metadata item. It records the file sync index (FSI) of the last move or rename for the item (either a file or a directory) or the FSI associated with the creation of the item. The server SFS uses this value to locate individual metadata items that need to be sent to polling clients during the synchronization process. These include any metadata items with a FSI value greater than the CSI value passed in by a client's sync poll call.

The sync fields in the server metadata are:

Server ID (SID): The server SFS assigns a SID when it creates a directory or file metadata item that is unique within a user's account. SIDs make synchronization more efficient and reliable by making it an ID-based process instead of a name-based one and by enabling the client SAs to track files and directories when they are moved or renamed.

File Sync Index (FSI): This value records the sequence of the change within a user's server account.

Client change time: This field records the time of the client native file system event that resulted in the change to the server state identified by the FSI field. For example, if a user renames a file in his directory on the client, this field records the time of that rename event. This time value is normalized to server time to account for the difference in time between the client machine and the server. The client SA passes this value when it pushes the rename change to the server. The server uses this field to arbitrate synchronization conflicts in favor of the most recent change.

Directory Sync Index (DSI) (for directory items only): This field records the DSI of the most recent change within the directory.

Previous version File ID (PFID) (for file items only): This field is passed down to the client SA as a hint to help it locate the previous version of a file if it needs to download the file.

Directories within the server SFS are named by their SID and contain metadata items for each file and directory item in the directory. The SID of the root directory is always 1.

Files in the server SFS are also named by their SID. Server SFS files begin with a prefix that contains their ID, length, update and create times. Following the prefix is the message digest array (MDA), which contains 16 bytes for every 4096 bytes of data in the file. The file's data follows and is encrypted if the user's account is encrypted. The client SA converts native files within the directory on the client machine into this format during the file upload process. Similarly files are converted back to their native format when the client SA downloads them from the server.

Figure 2:
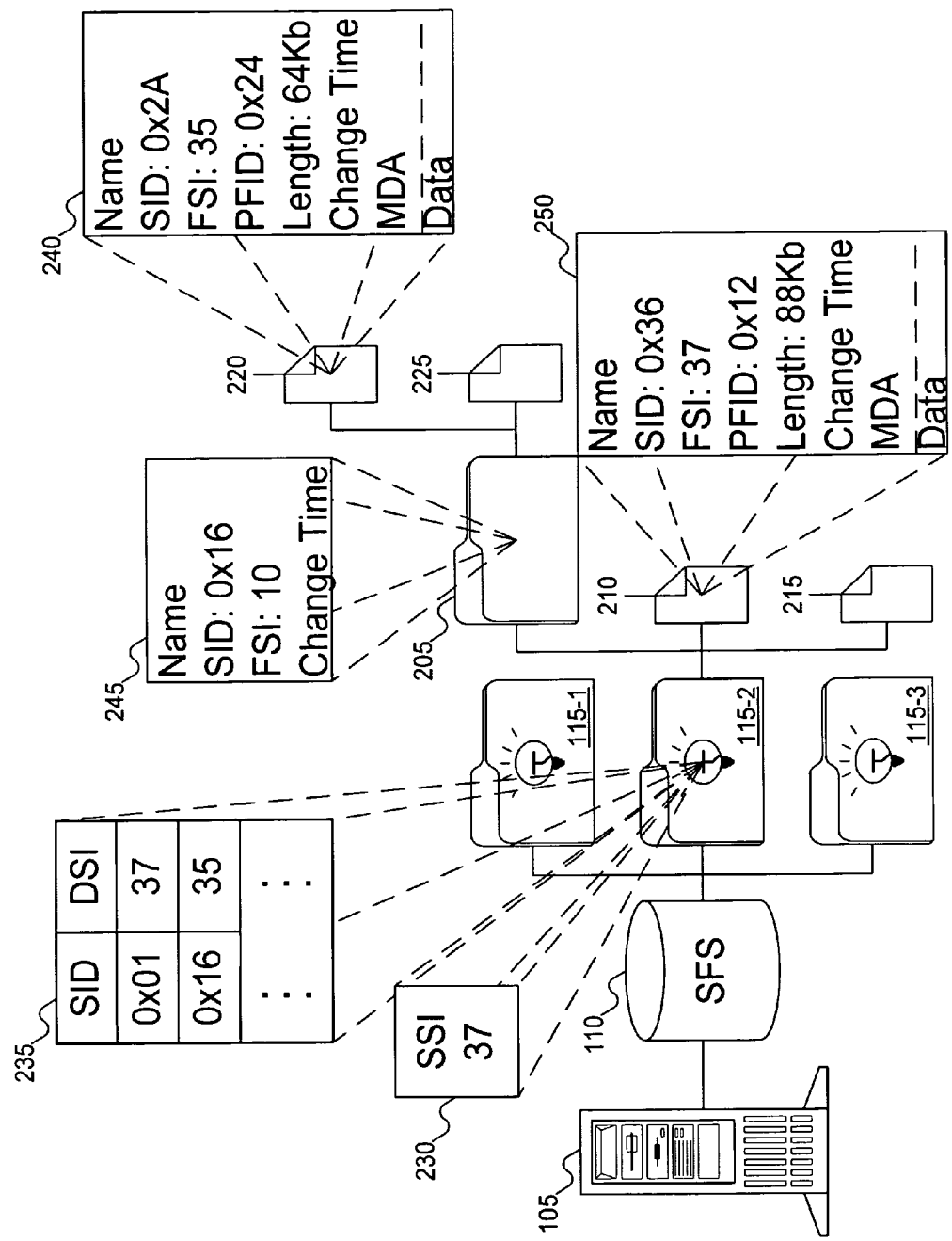
FIG. 2 shows an example of the data structures used in the server Synchronization File System of FIG. 1 to maintain a user's account, according to an embodiment of the invention.

FIG. 2 shows an example of the data structures used in the server SFS of FIG. 1 to maintain a user's account, according to an embodiment of the invention. In FIG. 2, the directory structure and data structures for folder 202 are shown. Folder 202 contains folder 205 and files 210 and 215. Folder 205, in turn, contains files 220 and 225.

SSI 230 contains the SSI for the entire account. As mentioned above, SSI 230 is the highest level of the hierarchy of SIs. Directory table 235, the middle level of the hierarchy of SIs, shows the directory table for the user's account. As mentioned above, directory table 235 tracks the DSI value associated with the last change to any file or subdirectory within the directory. Thus, for example, the root folder (which, as mentioned above, always has a SID of 1) has a DSI of 37. Folder 205, with a SID of 0x16, has a DSI of 35.

At the lowest level of SIs are the SIs associated with each file and folder in the account. Thus, metadata 240 for file 220 shows the file as having an (encrypted) name (although in alternative embodiments the name is not encrypted), a SID of 0x2A, a FSI of 35 (hence the DSI for folder 205 in directory table 235), and a PFID of 0x24. Metadata 240 also stores the length of the file, the file's create and update times (not shown, since they are also typically stored as part of the native operating system), and its MDA (discussed further below with reference to FIGS. 6-7), after which comes the file's data. Similarly, metadata 245 for folder 205 shows the folder as having an (encrypted) name, a SID of 0x16, a FSI of 10, and change time. (The difference between the FSI in metadata 245 and the DSI for the directory with SID 0x16 in directory table 235 is the difference between a change to folder 205 and a change within folder 205.) In comparison, metadata 250 of file 210 has an (encrypted) name, a SID of 0x36, a FSI of 37 (hence the DSI for the root folder in directory table 235), a PFID of 0x12, the file's length, create and update times (not shown in FIG. 2), MDA, and data.

Client File System

The client SA creates a client Synchronization File System (CSFS) on each client machine to coordinate the synchronization process with the server SFS. This file system contains metadata but no file data. Data files reside within the directory on the client as files native to the operating system of the client machine. Like the server metadata, the client metadata includes file and directory items with fields such as name, update and create time, and file length. Client names, however, are not encrypted.

The client SA monitors file system activity within the user's directory on the client. When file system activity occurs, the client SA records the event in the client metadata. In an embodiment of the invention running under the Windows XP/2000/NT operating system, the client SA monitors file system activity using a filter driver. In another embodiment of the invention running under the Windows 9x operating systems, the client SA monitors file system activity using a VxD. Throughout the rest of this document, the portion of the client SA responsible for monitoring file system activity will be referred to as a filter driver. During synchronization, when the client SA pulls down changes from the server and makes changes to the user's directory, it updates the client metadata to reflect those changes. Also, when the client SA pushes changes to the server during the second part of the synchronization process, it records new SID and FSI values returned by the server SFS into the client metadata file and directory items.

The sync fields in the client metadata are:
  Client ID (CID): The CID is assigned to a file or directory when a new file or new directory event is received by the client SA from the filter driver (i.e., some activity has been initiated in the directory on the client). The client SA uses the CID to locate metadata items when it is pushing changes to the server.
  Server ID (SID): The SID is the SID assigned when a file is uploaded or a directory is created on the server. The SID is returned to the client by the server. The client SA can also locate client metadata items by SID.
  File Sync Index (FSI): This FSI is the server SFS FSI field. The server returns this value when the client pushes a change to the server.
  Client change time: This field records the time when a client SA receives a file system event from its filter driver. For example, if a user renames a file in his directory on the client, this field records the time when that rename occurred.
  Flags: This field contains flags identifying metadata items with changes that need to be pushed to the server. This field also contains additional flags that are used to manage the synchronization process.

The client SA synchronizes with the server by synchronizing the client metadata with the server metadata. This is an ID-based process because SIDs are carried in both the client and server metadata. The client metadata has both a client and SID because a new file or directory is not assigned a SID until the file is uploaded or the directory is created on the server.

Figure 3:
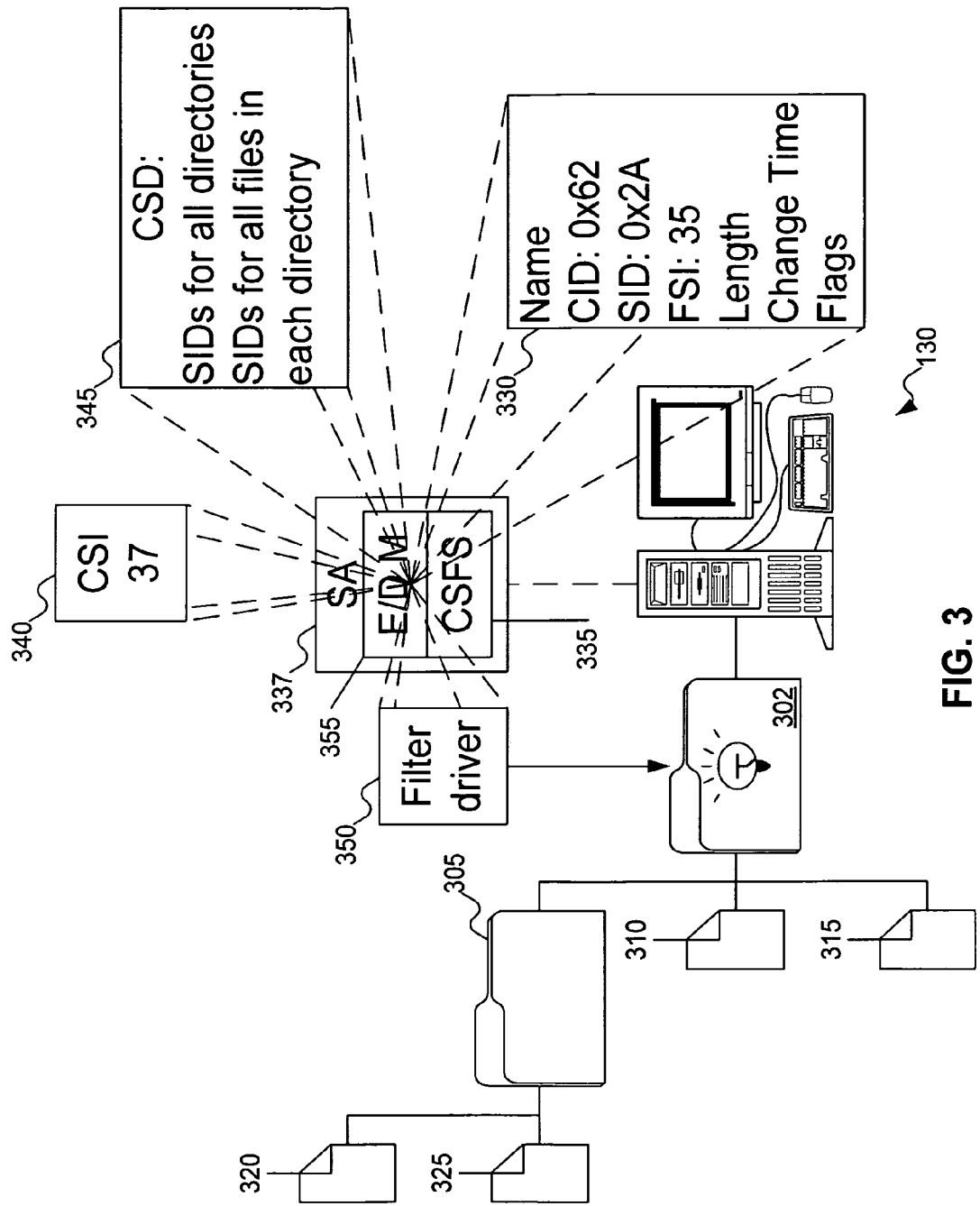
FIG. 3 shows an example of the data structures used in the client Synchronization Application of FIG. 1 to maintain a user's account, according to an embodiment of the invention.

FIG. 3 shows an example of the data structures used in the CSFS of the client of FIG. 1 to maintain a user's account, according to an embodiment of the invention. In FIG. 3, the directory structure and data structures for a user accessing folder 115-2 of server 105 (as shown in FIG. 2) via client 130 are shown. Folder 302 contains folder 305 and files 310 and 315. Folder 305, in turn, contains files 320 and 325.

Metadata 330 shows the metadata for file 320 as stored within CSFS 335, part of client SA 337. (Although metadata are not shown for the other files and folders within folder 302, a person skilled in the art will recognize that such metadata exist.) In metadata 330, file 320 is shown as having a name (which is typically not encrypted, although the name can be encrypted in an alternative embodiment of the invention), a CID of 0x62, a SID of 0x2A, a FSI of 35, the change time of the file, and the flags used in the synchronization process (such as identifying metadata items that need to be pushed to the server). Note that metadata 330 is not shown to store the data of file 320, which is stored in the native operating system of computer 130 within the folder structure, as expected.

FIG. 3 also shows CSI 340, client synchronization data (CSD) 345, and filter driver 350. CSI 340 stores the current state of the client, in terms of SIs as generated by the server. CSD 345 is used to track the state of the server the last time the client synchronized with the server, and stores the SIDs of each directory in the account and the SIDs of each file and directory within each directory in the account. CSD 345 is discussed more below with reference to FIGS. 4A-4C. Finally, as mentioned above, filter driver 350 is used to monitor the activity of files within the folder on the client. Specifically, filter driver 350 watches for other applications accessing the files in folder 302, so as to determine which files on the client have been changed. When the client later synchronizes with the server, the client can use the information provided by the filter driver to identify which files to push to the server. Filter driver 350 has a secondary role of preventing collisions between file synchronization and running applications. Filter driver 350 is discussed further in the section below entitled "Accessing Files."

Note that client SA 337 is shown including encryption/decryption module 355. In an embodiment of the invention, server 105 and client 130 communicate over an untrusted network. That is, the communications between server 105 and client 130 are subject to interception. Further, server 105 is itself untrusted. To protect the data in the server account, the files are stored in an encrypted format. Further, server 105 does not have access to the encryption key, and therefore cannot decrypt the information. To accomplish this, before data are transmitted from client 130 to server 105, encryption/decryption module 355 encrypts the information. And when client 130 receives data from server 105, encryption/decryption module 355 decrypts the information after receipt. In this manner, client 130 has unencrypted access to the data in the files. Client 130 can use any desired key for encryption, as well as any desired encryption product.

Although in an embodiment of the invention neither server 105 nor the lines of communication between server 105 and client 130 are trusted, a person skilled in the art will recognize situations in which server 105 and/or the lines of communication between server 105 and client 130 are trusted. Under such circumstances, encryption/decryption module 355 can be eliminated.

Synchronization Process

The client polls the server for changes by other clients by passing its current CSI to the server in a sync polling call. If the CSI matches the server account's SSI value, then the client is up to date with the server. Otherwise the client SA requests server synchronization data (SSD). The SSD contains the following data:
  Server's current SSI.
  SIDs of the directories with changes.
  SIDs of the child directory and child file items for each changed directory.
  Server metadata items for any items with FSIs greater than the CSI passed in by the client's sync poll call.

With the SSD, the client SA updates the client's directory and metadata to match the server state. To manage this update process, the client SA maintains the CSD that it uses to track the state changes of the server. CSD data includes:
  SIDs of all the server directories that existed for the previous CSI.
  For each directory SID, the set of directory and file SIDs contained in the directory that existed for the previous CSI.

The client SA compares the SSD passed back from the server SFS to its CSD to determine how the client needs to be updated. The client SA only has to examine the directories that have been identified as having changes in the SSD. Note that the client SA does not have to examine the entire CSD. This SSD-CSD comparison process can uncover the following situations:

- SID is in the SSD but not in the CSD. The SID identifies a new file or directory that exists on the server and needs to be replicated on the client. In the case of a file it must be downloaded; directories just need to be created. In this case, the SSD also includes the metadata item for the file or directory.
- SID is in the CSD but not in the SSD. The SID identifies a file or directory that has been deleted on the server but is still present on the client. The client SA must delete the file or directory.
- SID is present in both sets but in different directories. The SID identifies a file or directory that has been moved from one directory to another on the server. The client SA must replicate the move. In this case, the SSD also includes the metadata item for the file or directory that includes the name of the file or directory. The name must be checked in case the file was also renamed on the server.
- SID is present in both sets in the same directory. The SID identifies a file that has not been moved or deleted on the server. The client SA must still check the SSD for a metadata item with the SID in case the file or directory was renamed on the server.

With each change the client SA makes to the client native file system it also makes corresponding updates to the client metadata. When this process is complete, the client has updated its CSD to reflect the changes sent by the server SFS in the SSD.

At this point, the client SA is in sync with the server as defined by the SSD it received from the server. The client SA now checks its own client metadata for any changes it needs to push to the server. These changes include new file (upload), new directory, move, rename, and delete file or directory.

On file upload and directory create operations the server returns the SID assigned to the new file or directory so that the client SA can store the SID in the client's file or directory metadata item.

On move, rename and delete operations, the client SA identifies the server file or directory by SID that is carried in the client metadata.

On all change operations except for delete, the client SA passes the client change time (adjusted to server time) to the server.

On each change operation the server SFS returns the SSI of the change to the user's server data to the client. If the SSI returned by a server change operation equals the client SA's CSI plus one, it indicates that the client is the only changer and it can update its CSD so that the next time it makes a sync polling call it will not get its own changes returned in the SSD. Updating the CSD includes updating the CSI as well as making the necessary update to the CSD directory SID sets to reflect the update.

If the SSI returned by the server is greater than the client SA CSI plus one, it indicates that another client has made a change to the server data. In this case, the client cannot update its CSD or it would miss the changes made by the other client(s) on the next sync polling call. When this occurs, the client SA does get its own changes returned to it on the next sync call but they are filtered out and have no negative impact other than the minor overhead associated with passing redundant data in the SSD from the server SFS to the client.

Figure 4C:
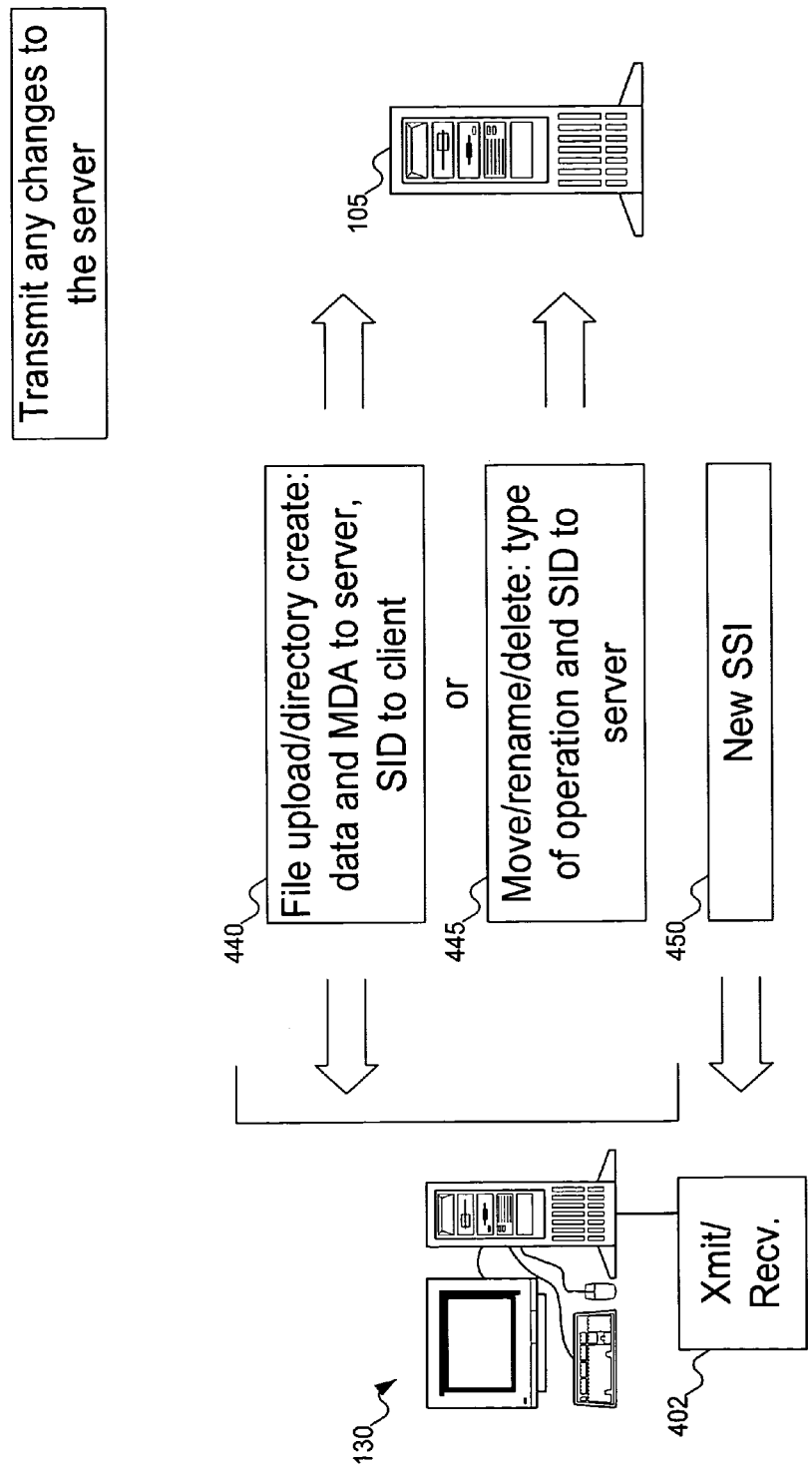

FIGS. 4A-4C show the transfer of information between the client and server of FIG. 1, according to an embodiment of the invention. In FIG. 4A, client 130 sends the CSI to server 105, as shown in box 405. (Client 130 includes transmitter/receiver 402 to communicate with server 105.) Server 105 compares the received CSI with the SSI. If the two have the same value, then server 105 returns the SSI to the client, as shown in box 410. Because the SSI has the same value as the CSI, client 130 knows that client 130 is synchronized with server 105. Then, if there are any changes to push to server 105, client 130 can skip to FIG. 4C. Otherwise, server 105 has changes that client 130 lacks. Server 105 then sends the SSD to client 130 (in response to a request for the SSD by the client), informing the client of the pertinent changes, as shown in box 415. Specifically, the SSD includes the SSI, the SIDs of any directories that contain changes since the last time client 130 synchronized with server 105, the SIDs of all items (files and directories) in the changed directories, and the metadata of all items (files and directories) that have been changed since the last time client 130 synchronized with server 105.

As mentioned above, by comparing the SSD with the CSD, client 130 can determine what changes have been made to the account on server 105. Referring now to FIG. 4B, the four possible results of the comparison of the CSD and SSD are shown. In box 420, a SID is found in the SSD but not the CSD. Client 130 then requests the appropriate file from server 105 or creates the appropriate directory in the folder on the client. In box 425, a SID is found in the CSD but not the SSD. Client 130 then deletes the appropriate file or directory. In box 430, a SID is found in different directories in the CSD and SSD. Client 130 then moves (and if necessary, renames) the appropriate file from one directory to another. Finally, in box 435, a SID is found in the same directory in both the CSD and SSD. Client 130 then checks to make sure that the file has not been renamed on the server.

Note that the operations shown on FIG. 4B are performed one at a time on individual files or directories. That is, on FIG. 4B, the client determines updates to retrieve from the server based on the comparison of the SSD with the CSD, and requests changes from the server one file or directory at a time. Once the client is finished performing the changes on one file or directory, the client checks to see if there are any further changes to make based on the comparison of the SSD with the CSD. If there are further changes, the client can perform any of boxes 420-435 on the next file or directory.

Once client 130 has downloaded all the pertinent changes from server 105, client 130 can send all the pertinent changes made on client 130 to server 105. Referring to FIG. 4C, in box 440 client 130 uploads a file to server 105, or instructs server 105 to create a directory. Server 105 responds by sending back the SID for the newly uploaded file/created directory, so that client 130 can store the SID in the CSD. In box 445, client 130 sends the appropriate instructions to server 105 to move, rename, or delete files and directories. Finally, in box 450, server 105 sends to client 130 the new SSI, reflecting the changes uploaded by client 130. Client 130 can then compare the new SSI with the current CSI. As mentioned above, the new SSI will be one greater than the current CSI if no other clients have synchronized other changes with server 105. If the new SSI is one greater than the current CSI, then client 130 updates its CSI, and the process is complete. Otherwise, client 130 knows that there are new changes to download from server 105, and the process can return to box 415 on FIG. 4A.

Note that the operations shown on FIG. 4C are iterative. That is, as with FIG. 4B, the client uploads a single file to the server, sends instructions to the server to create a single directory, or sends instructions to the server to move, rename, or delete a single file or directory. In response to the client's instructions, the server sends the new SSI to the client. In this manner, the client can determine whether any other clients are making changes in parallel with client 130. If it happens that another client is making changes in parallel with client 130, then the SSI received from server 105 will be greater than expected. In that case, client 130 can use the last "expected" SSI value as the CSI when the client requests the new changes from the server. But note that client 130 does not interrupt the upload process to download the new changes. Instead, client 130 completes its upload process before returning to box 415 on FIG. 4A to download the changes made on the server by the other client.

When the client is uploading a file to the server, the client starts by making a copy of the file. The client SA uses the filter driver to read the file. The filter driver makes sure that the copy operation does not interfere with an application attempting to access the file during the copy. Copying the file is relatively quick, and once the copy is made the client SA can operate on the copy of the file without worrying about another application on the client trying to access the file. Once the file has been completely uploaded to the server, the client can then delete the temporary copy of the file.

Figure 5:
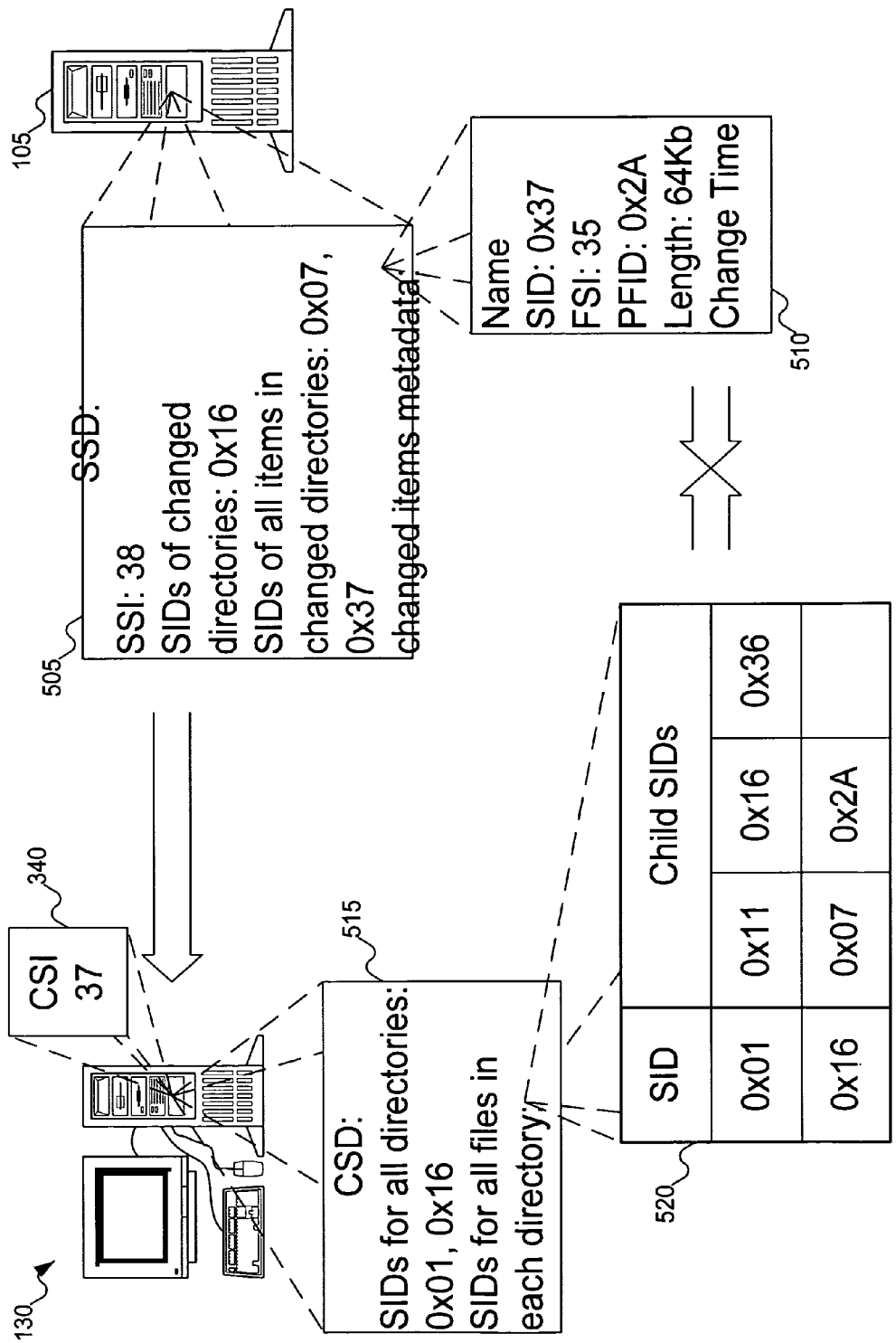
FIG. 5 shows the client of FIG. 1 comparing the server synchronization data with the client synchronization data, in order to determine which file(s) have changed, according to an embodiment of the invention.

FIG. 5 shows the client of FIG. 1 comparing the SSD with the CSD, in order to determine which file has changed, according to an embodiment of the invention. In FIG. 5, the client has received SSD 505 from server 105. SSD 505 includes a new SSI (38), the SIDs of the directories that have changed items (SID 0x16), the SIDs of all items in the changed directories (SID 0x37, which is a new SID to client 130), and the metadata for the changed item. The metadata is shown in box 510. In particular note that metadata 510 includes the PFID of 0x2A. Client 130 locates the metadata item for the file with SID 0x2A in its client metadata. From the client metadata item the client can construct the path for the file. This path identifies the previous version of the file, if it exists. (Another tactic the client can use to determine if the file has a previous version is to see if the client's directory corresponding to the directory in which file resides on the server has a file with the same name as that in the metadata provided by the server.) Client 130 can then request the MDA of the file with (new) SID 0x37 to determine which blocks of the file have been changed.

Partial Downloads and Uploads

A single server can support folders for a large number of users, and each user can have several clients accessing a single folder. Communicating with all of these clients can take time, and while a server is communicating with one client, the server has less processing capability to support a second client. After some number of simultaneous client requests, the server cannot service any additional clients. It is therefore desirable to minimize the amount of data a server sends to or receives from a client, so that other clients' requests can be handled in a timely manner.

Often, when files are updated, only a portion of a file is changed. For example, when a text document is edited, some paragraphs are removed, and other paragraphs are inserted. Not every byte in the file is changed: usually, only a small percentage of the file is actually changed. In addition, changes tend to be localized. It is common that all the changes to a file occur within a relatively short span. If the server were to receive or transmit the entire file, even when only a few bytes have changed, the server would be wasting time transmitting or receiving information already present on the destination machine.

Similarly, if a user has a slow network connection and has made a small change to a large document, it can be time-consuming to have to wait for the entire document to upload or download. An embodiment of the invention uses MDAs to implement partial downloads and uploads to minimize the amount of data that is transferred over the wire when a file is updated. MDAs are arrays of 16-byte message digests computed from each 4K block of a file. (A person skilled in the art will recognize that other sizes of message digests and blocks are possible and that synchronization can be performed on parts of the file that are larger or smaller than a single block.) Message digests are one-way hashes that have an extremely low probability of collision, and as such are quasi-unique identifiers for the blocks from which they were computed. In an embodiment of the invention, the hash function is an MD5 hash, although a person skilled in the art will recognize that other hash functions can be used. The client SA computes and compares MDAs. By comparing an MDA computed by the client with an MDA retrieved from the server, the client can identify individual blocks with changes. After being uploaded to the server, MDAs are stored with the file data in the server SFS database. Thus, if data is changed in only one block, only that one block needs to be transmitted. If the entire file is very large (and it is common to see files that are megabytes in size), transmitting only one block is very efficient relative to transmitting the entire file.

Figure 6:
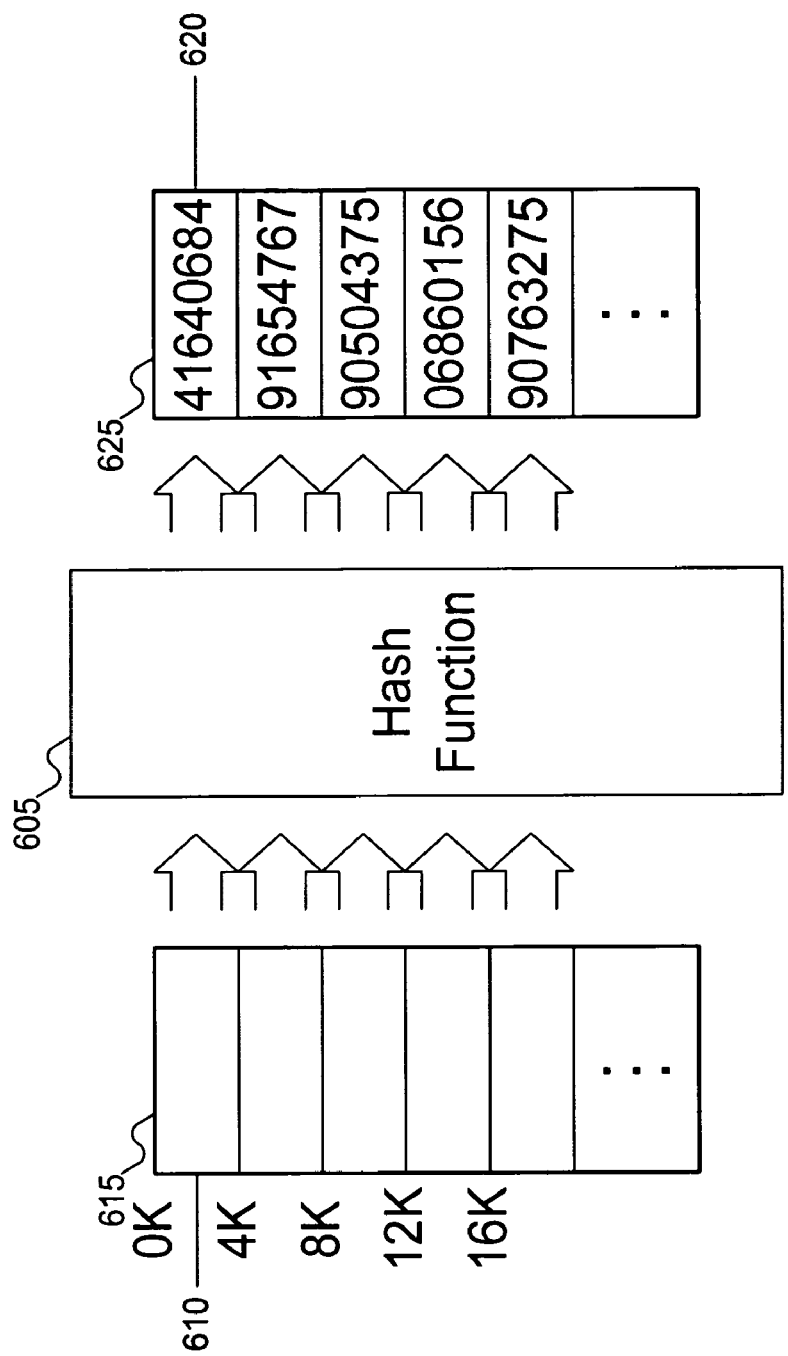
FIG. 6 shows a hash function used by the client of FIG. 1 to reduce the amount of information transmitted between the client and server Synchronization File System, according to an embodiment of the invention.

FIG. 6 shows an example hash function used by the client of FIG. 1 to reduce the amount of information transmitted between the client and server, according to an embodiment of the invention. In FIG. 6, hash function 605 is used to calculate the message digests of the MDA. Hash function 605 takes a block of the file, such as block 610 of file 615, and computes the message digest, such as message digest 620 in MDA 625. MDA 620 can then be used to determine if the file can be only partially uploaded. If at least a threshold number of message digests in the MDAs on the client and server match, then only the blocks corresponding to message digests that differ between the client and server need to be transmitted. On the other hand, if less than a threshold number of message digests in the MDAs match, the entire file is transmitted.

Upload

Before the client SA uploads a file, it computes an MDA from the file. It then requests from the server the MDA for the version of the file on the server by sending to the server the SID of the file, the name of the file, and the directory to which the file is to be uploaded. The server then checks to see if it has a file with that SID or if there is a file with the same name as that specified by the client in the directory to which the client is uploading the file. If the server finds a version of the file, it returns the file's MDA to the client. The client SA compares the two MDAs and if a sufficiently high number of message digests match, it performs a special upload where only the differing message digests and their corresponding 4K data blocks are uploaded. The server constructs the new version of the file by starting with a copy of the previous version and modifying it with the uploaded data. Once the file has been completely uploaded, the server then stores the file in the specified directory and updates the file metadata.

Download

Before the client SA downloads a file, it attempts to find a previous version of the file. The client SA can use the PFID passed down by the server with the new synchronization metadata to this end. If a previous version exists, the client SA uses the filter driver to copy the file. This allows other applications to access the original file without interference from the client SA. The client also computes a MDA from the file. The client SA then requests the MDA from the file to be downloaded and compares the two MDAs. If the two arrays are sufficiently similar, the client SA performs a special download where it requests the specific 4K blocks that have differing message digest values. It creates the download file by modifying the copy of the file with the requested downloaded 4K blocks. On the other hand, if less than a threshold number of message digests in the MDAs match, then the entire file is downloaded from the server. Once the download file is completely constructed, the client inserts the download file into its final location, replacing an older version of the file if it exists.

Figure 7:
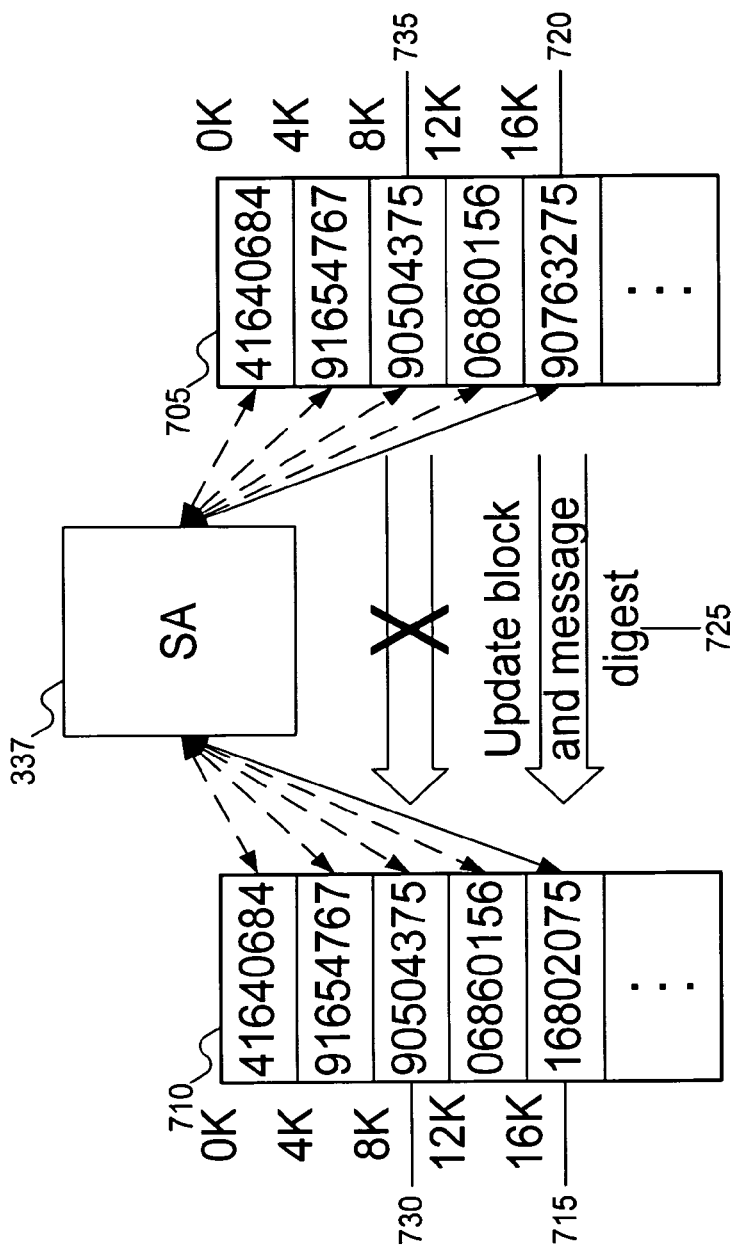
FIG. 7 shows an example of the client of FIG. 1 pulling a specific block from the server Synchronization File System, according to an embodiment of the invention.

FIG. 7 shows the client of FIG. 1 pulling a specific block from the server, according to an embodiment of the invention. Although FIG. 7 is shown in terms of synchronizing the client with the server by downloading a block from the server, a person skilled in the art will recognize that FIG. 7 can be easily modified to show the client uploading a block to the server. In FIG. 7, client SA 337 compares the message digests received from the server (MDA 705) with the message digests computed on the client (MDA 710). In particular, the comparison identifies that one block in the file on the client, with message digest 715, differs from one block on the server, with message digest 720. By comparing MDAs 705 and 710, client SA 337 can identify the block to pull down from the server, shown by arrow 725. Note that since other blocks, such as blocks 730 and 735, have the same message digest, these other blocks are not retrieved from the server.

Accessing Files

The client SA uses a driver read function exported by its filter driver when the client SA reads files in the directory on the client. The client SA reads files in two situations: during file uploads, and during partial downloads when it computes an MDA for a current file.

The client SA uses the exported driver read function so that it can read files within the user's directory without interfering with running applications. When the client SA makes a driver read call, the driver monitors file system activity to detect if any other processes attempt to access the file during the call. If an access is detected, the filter driver temporarily suspends the operation, cancels the client SA read call, and then releases the suspended operation so that it can proceed normally.

Flowcharts

Figure 8A:
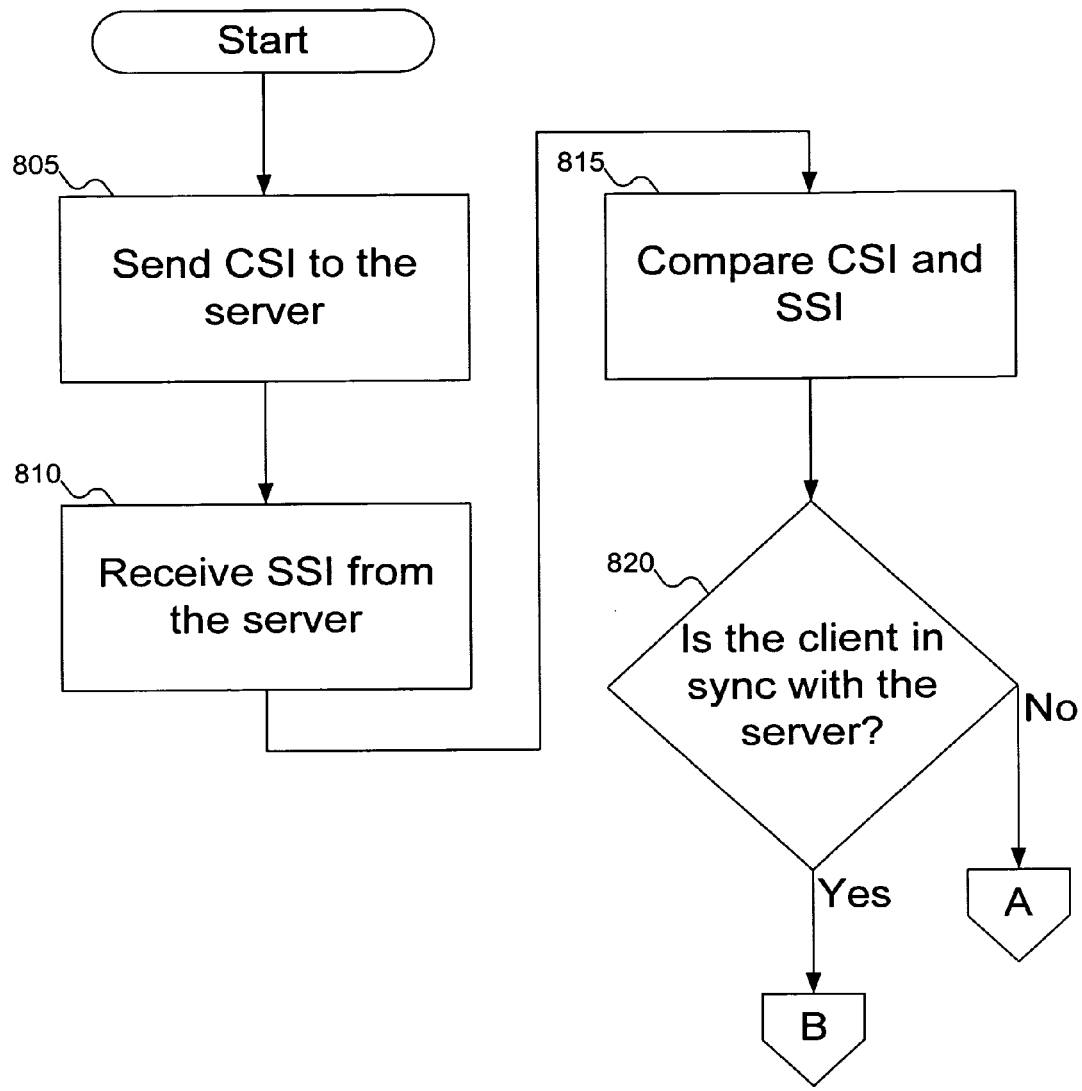
FIGS. 8A-8B show a flowchart of the procedure for synchronizing the clients and server of FIG. 1, according to an embodiment of the invention.
Figure 8B:
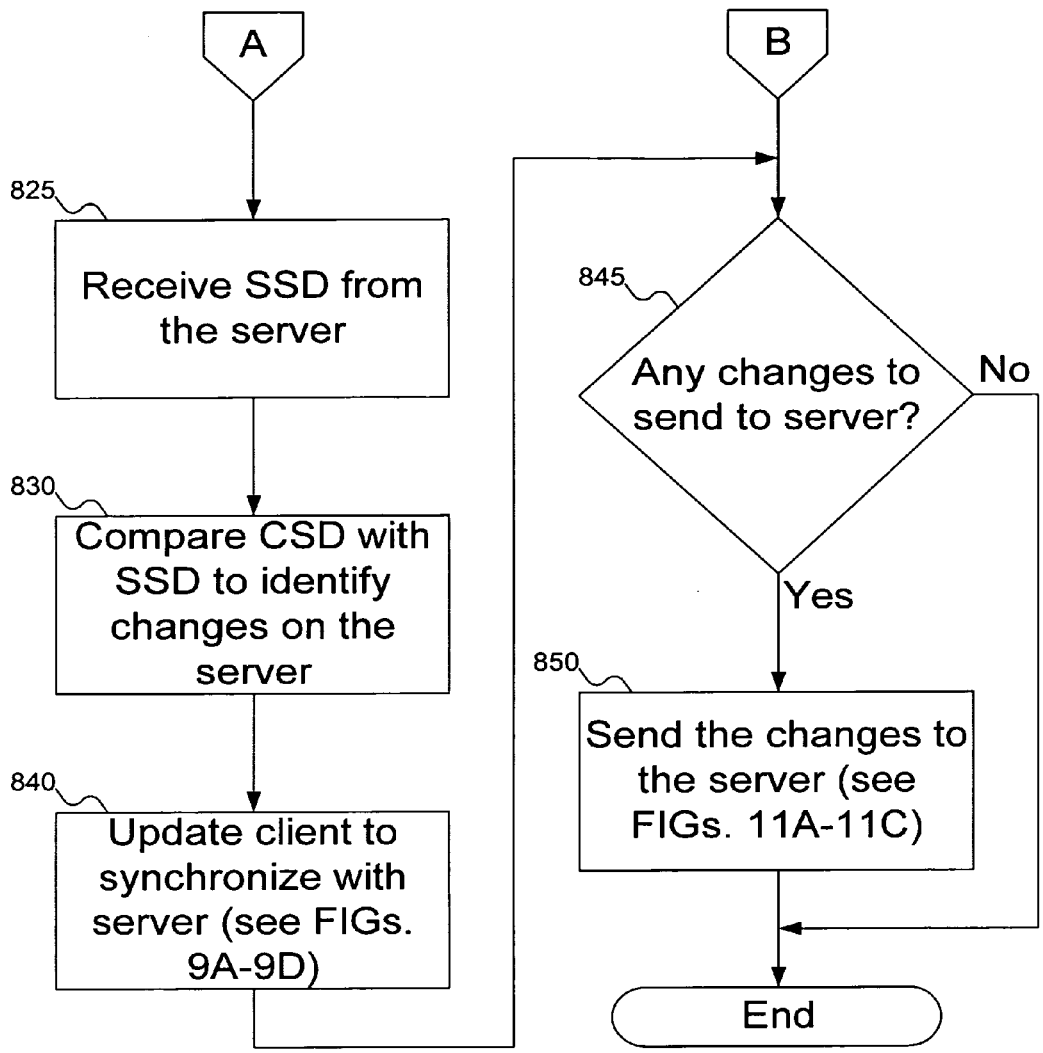

FIGS. 8A-11F show flowcharts of the procedures used to synchronize the client and server. FIGS. 8A-8B show a flowchart of the procedure for synchronizing the clients and server of FIG. 1, according to an embodiment of the invention. In FIG. 8A, at step 805, the client sends the CSI to the server. At step 810, the client receives the SSI from the server. At step 815, the client compares the CSI and SSI. Step 820 branches, based on whether or not the client is in sync with the server. If the client is not in sync with the server, then at step 825 (FIG. 8B), the client receives the SSD from the server. At step 830, the client compares the CSD with the SSD to identify any changes on the server that the client is lacking. At step 840, the client synchronizes with the server to download any changes on the server. At step 845 (FIG. 8C), the client checks to see if it has any changes that need to be sent to the server. If so, then at step 850 the client sends the changes to the server.

Figure 9A:
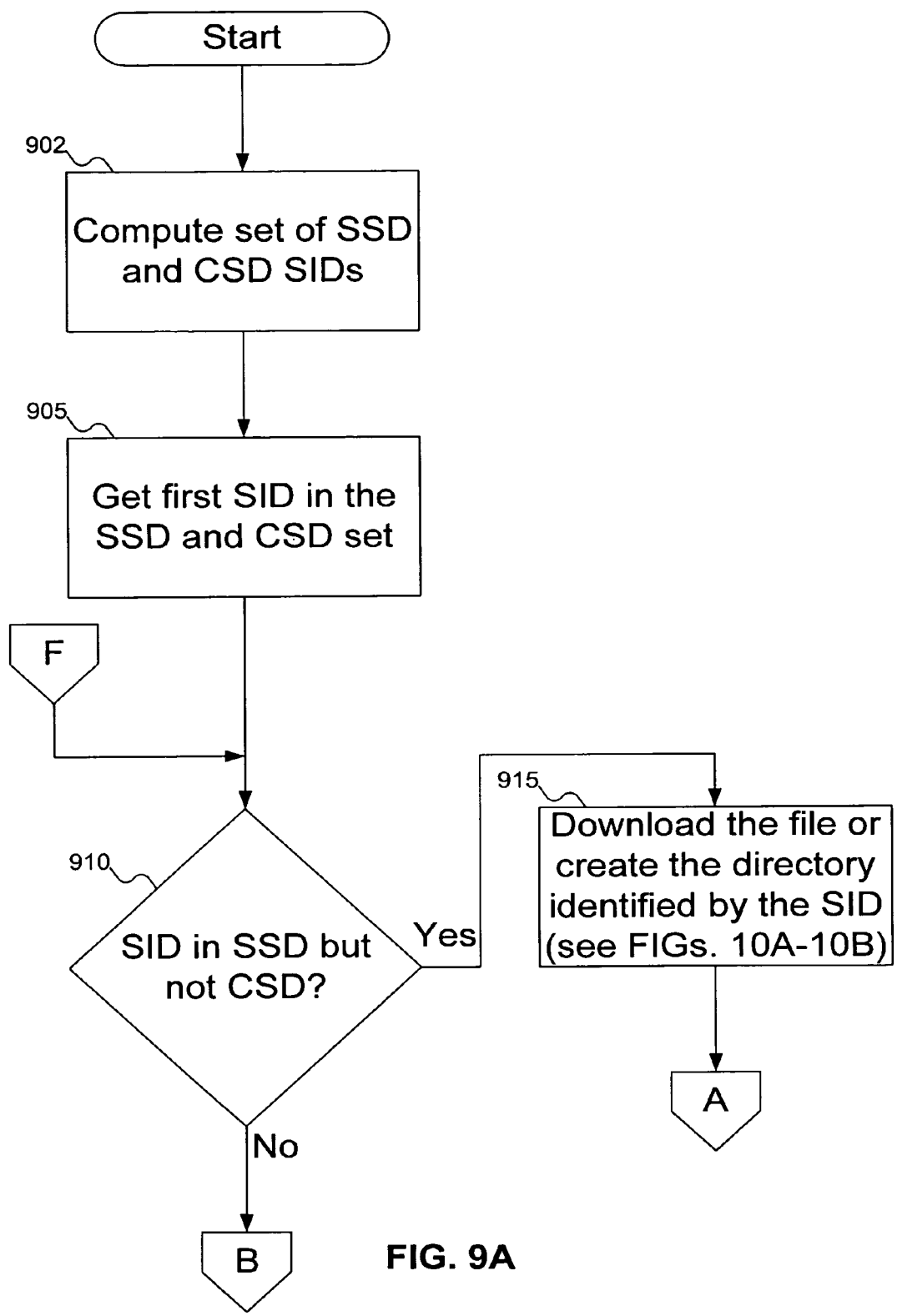
FIG. 9A-9E show a flowchart of the procedure used to pull changes from the server to a client of FIG. 1, according to an embodiment of the invention.
Figure 9B:
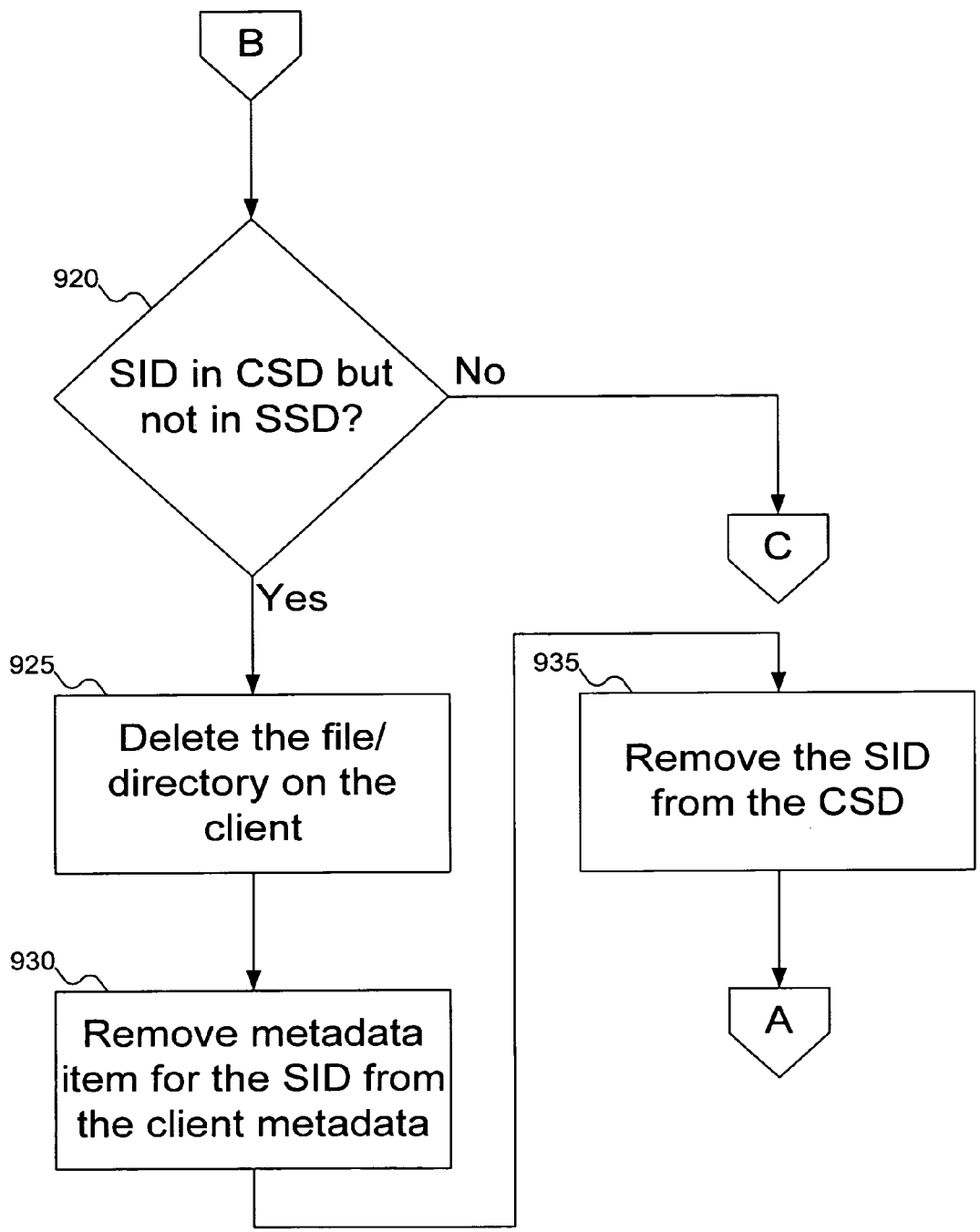
Figure 9C:
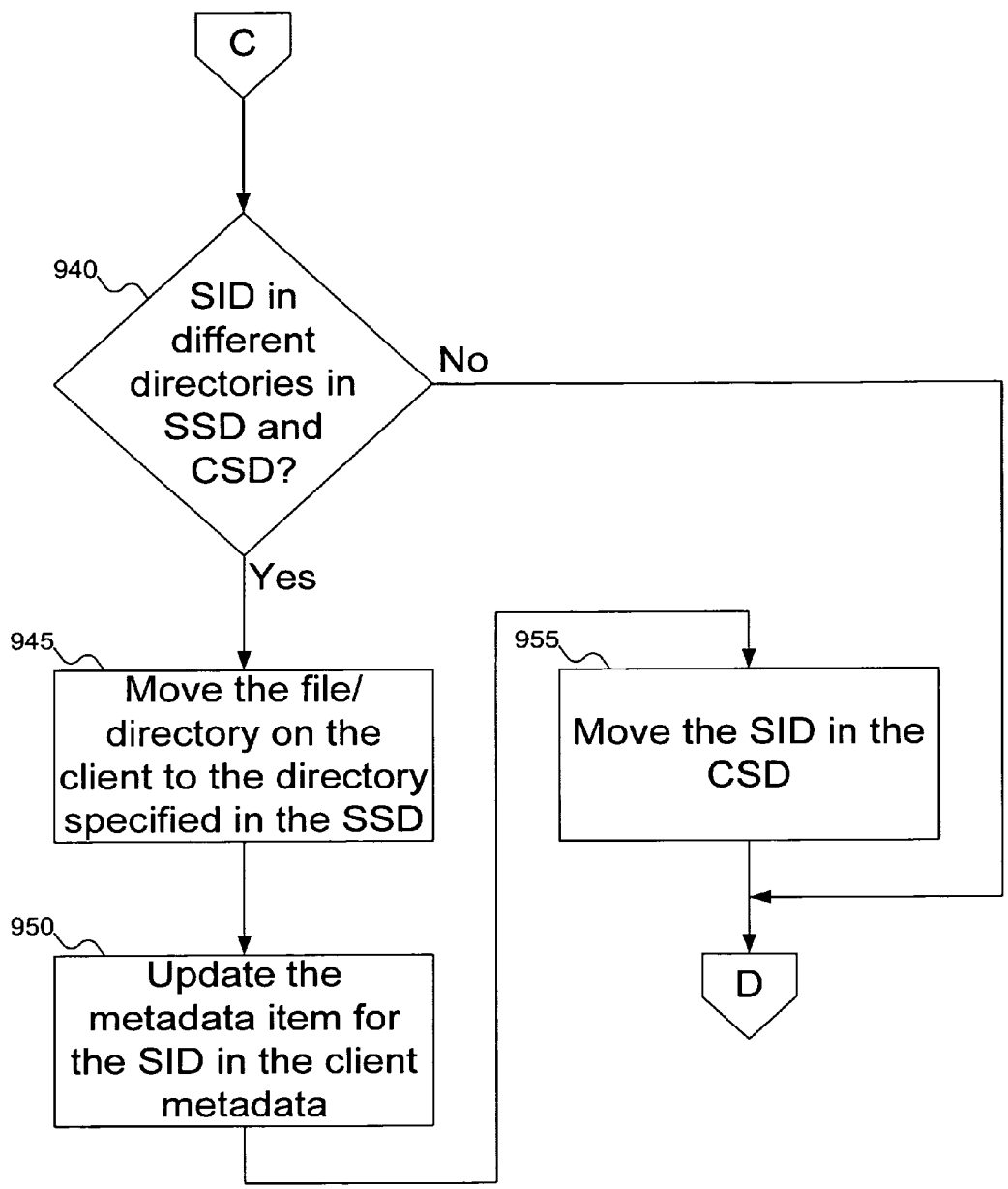
Figure 9D:
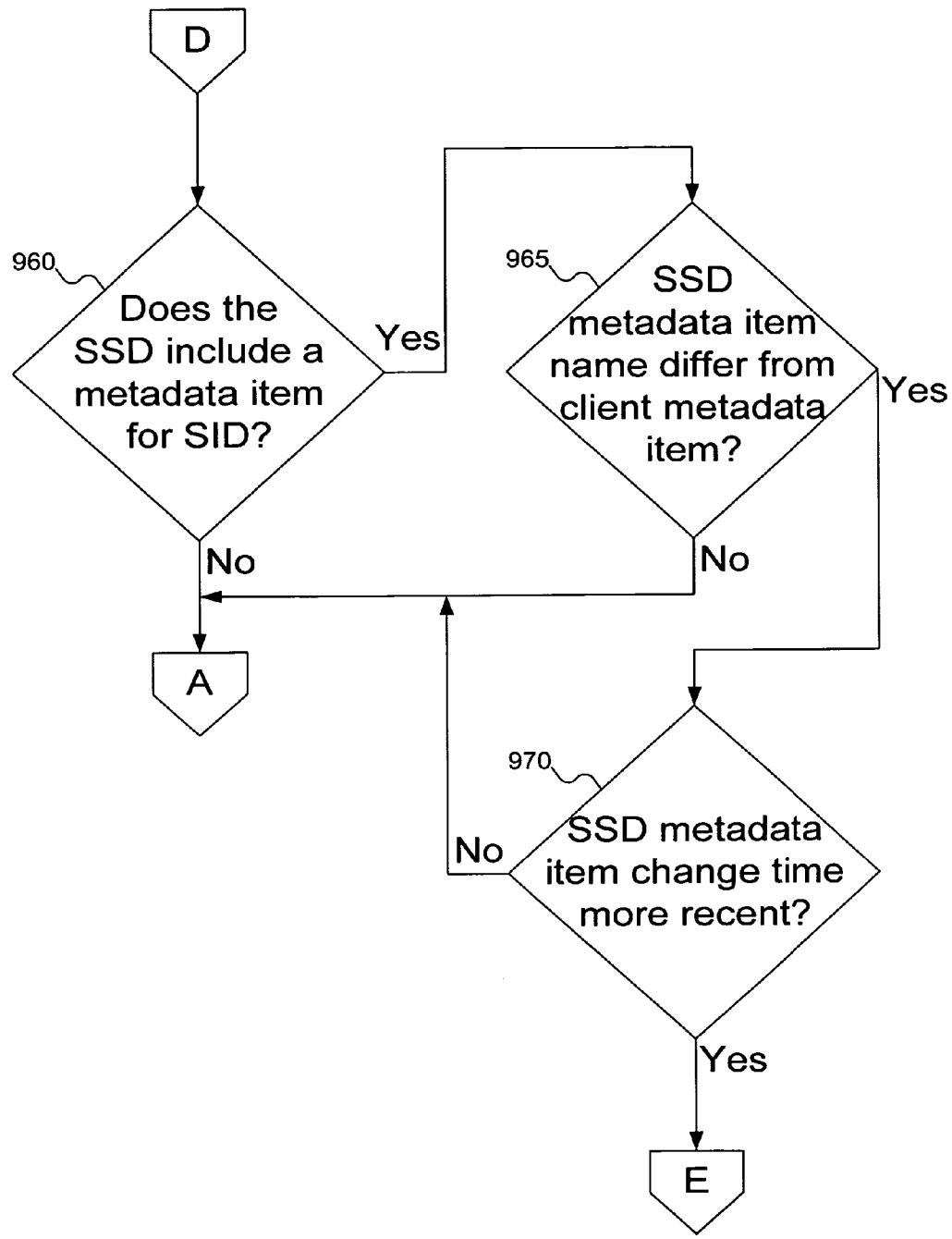
Figure 9E:
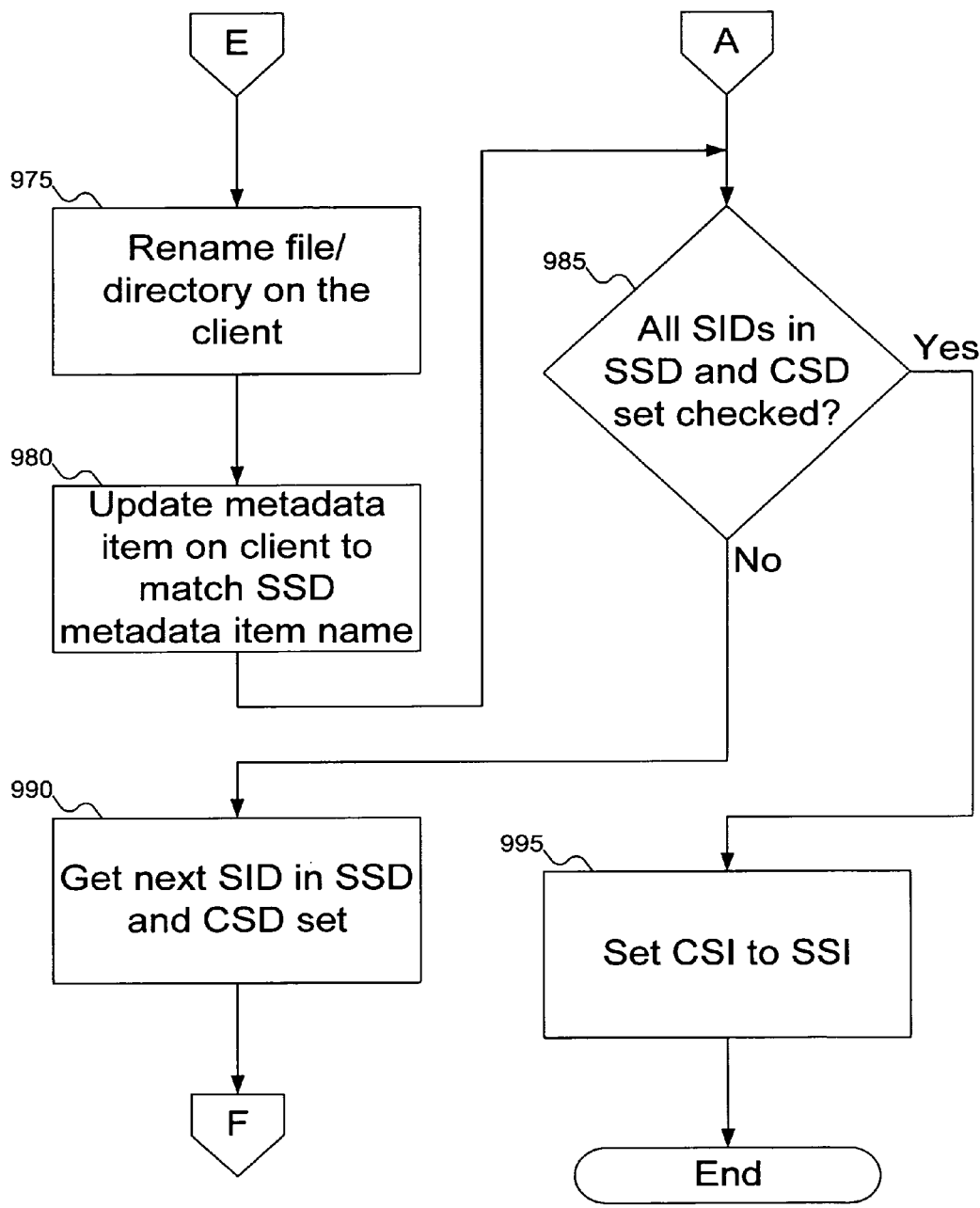

FIGS. 9A-9E show a flowchart of the procedure used to pull changes from the server to a client of FIG. 1, according to an embodiment of the invention. In FIG. 9A, at step 902, the client computes the SSD and CSD set of SIDs, which is the union of the set of SIDs in the directories of the SSD with the set of the SIDs in the same directories of the CSD. At step 905, the client selects an SID in the SSD and CSD set. At step 910, the client checks to see if the SID is in the SSD but not the CSD. If the SID is in the SSD but not the CSD, then there is a file or directory on the server not on the client. At step 915, the client downloads the file from the server or creates a directory.

At step 920 (FIG. 9B), the client checks to see if the SID is in the CSD but not the SSD. If so, then at step 925 the client deletes the file/directory on the client. At step 930, the client removes the metadata item for the file/directory from the client metadata. Finally, at step 935, the client removes the SID from the CSD.

At step 940 (FIG. 9C), the client checks to see if the SID is in different directories in the CSD and SSD. If the SID is in different directories in the CSD and SSD, then at step 945 the client moves the file/directory on the client to the directory specified by the SSD. At step 950, the client updates the metadata for the item in the client metadata. Finally, at step 955, the client moves the SID in the CSD to reflect the change made on the client.

At step 960 (FIG. 9D), the client checks to see if the SSD includes a metadata item for the SID. Note that this check is made whether or not the SID was determined to have been moved to a different directory at step 940 (on FIG. 9C). If the SSD includes a metadata item for the SID, then at step 965 the client checks to see if the SSD metadata item has a different name from the name for the SID on the client. At step 970, the client checks to see if the client metadata item has a more recent change than the SSD metadata item. If the SSD metadata item includes a rename that is more recent than any file rename on the client, then at step 975 (FIG. 9E) the file/directory on the client is renamed, and at step 980 the client metadata is updated to match the SSD metadata item name. If the SSD did not include a metadata item for the SID, or if the name is the same, or if the client renamed the file more recently than the server did, then steps 975 and 980 are not performed.

Regardless of the results of the checks at steps 910, 920, 940, 960, 965, and 970, at step 985 the client checks to see if there are any further SIDs in the SSD and CSD that need to be checked. If there are any remaining SIDs to check, then at step 990 the client gets the next SID and returns to step 910 (on FIG. 9A). Otherwise, at step 995 the client sets the CSI to the value of the SSI, and the client has retrieved all changes from the server.

Figure 10A:
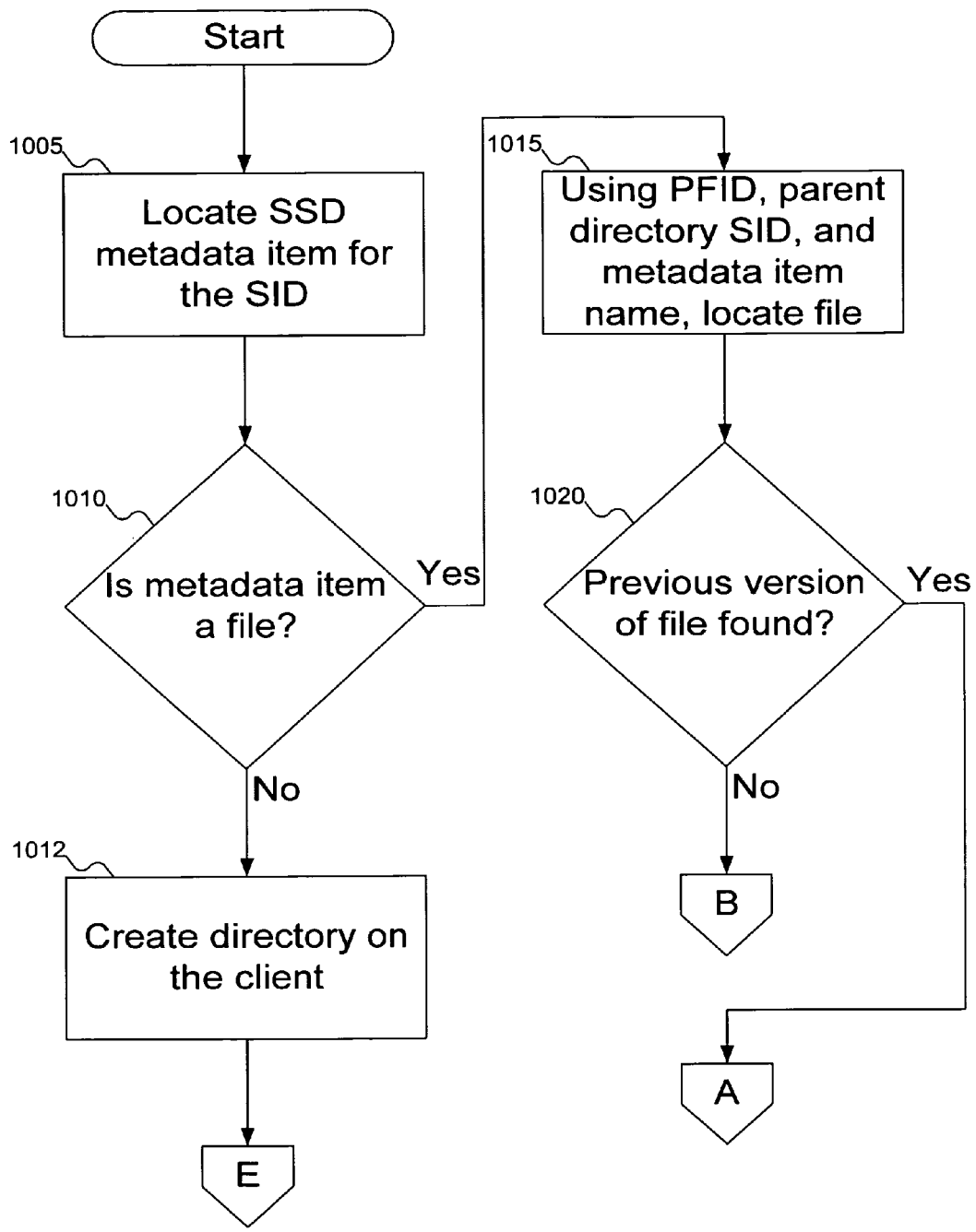
FIGS. 10A-10C show a flowchart of the procedure used to download files from the server to a client of FIG. 1, according to an embodiment of the invention.
Figure 10B:
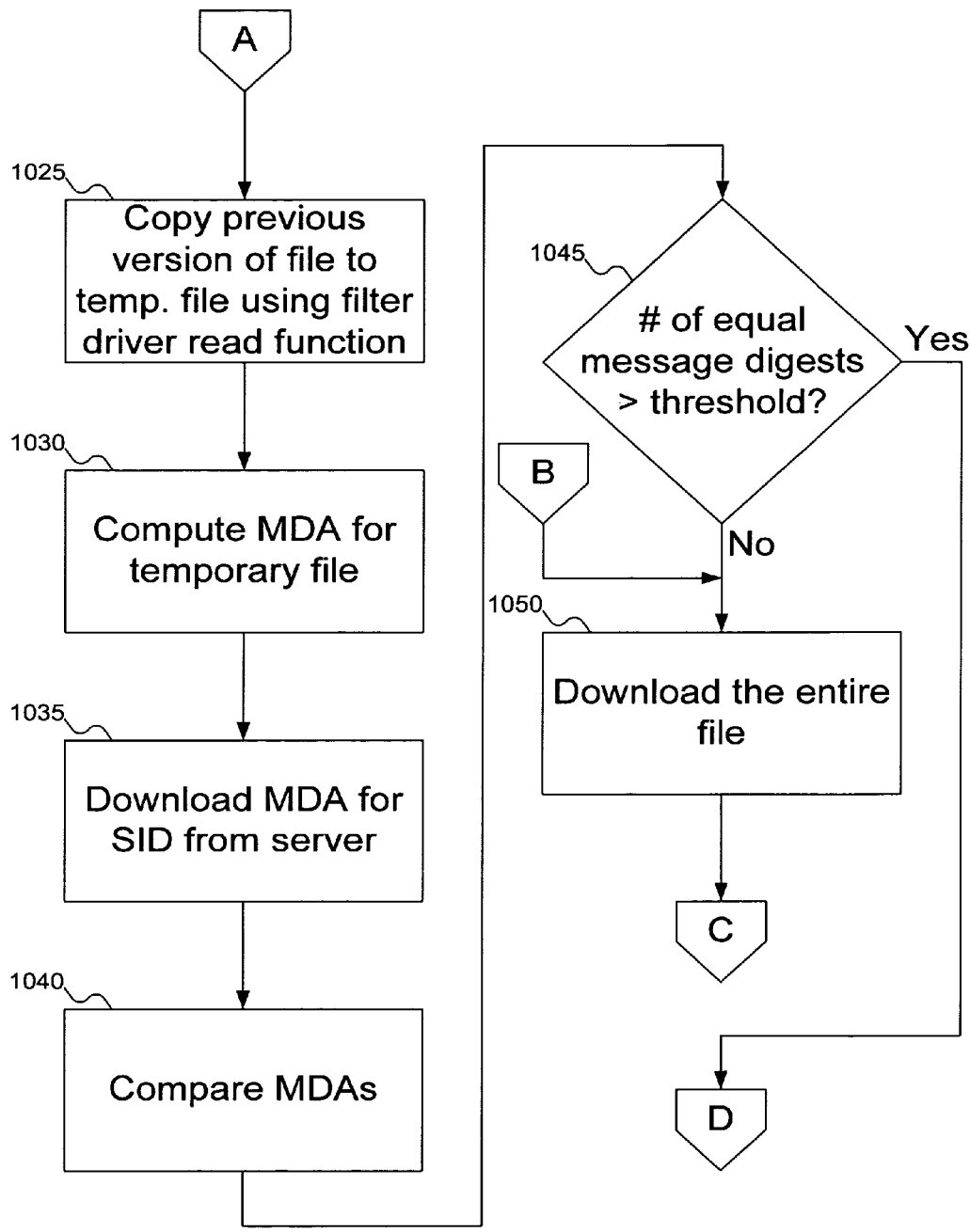
Figure 10C:
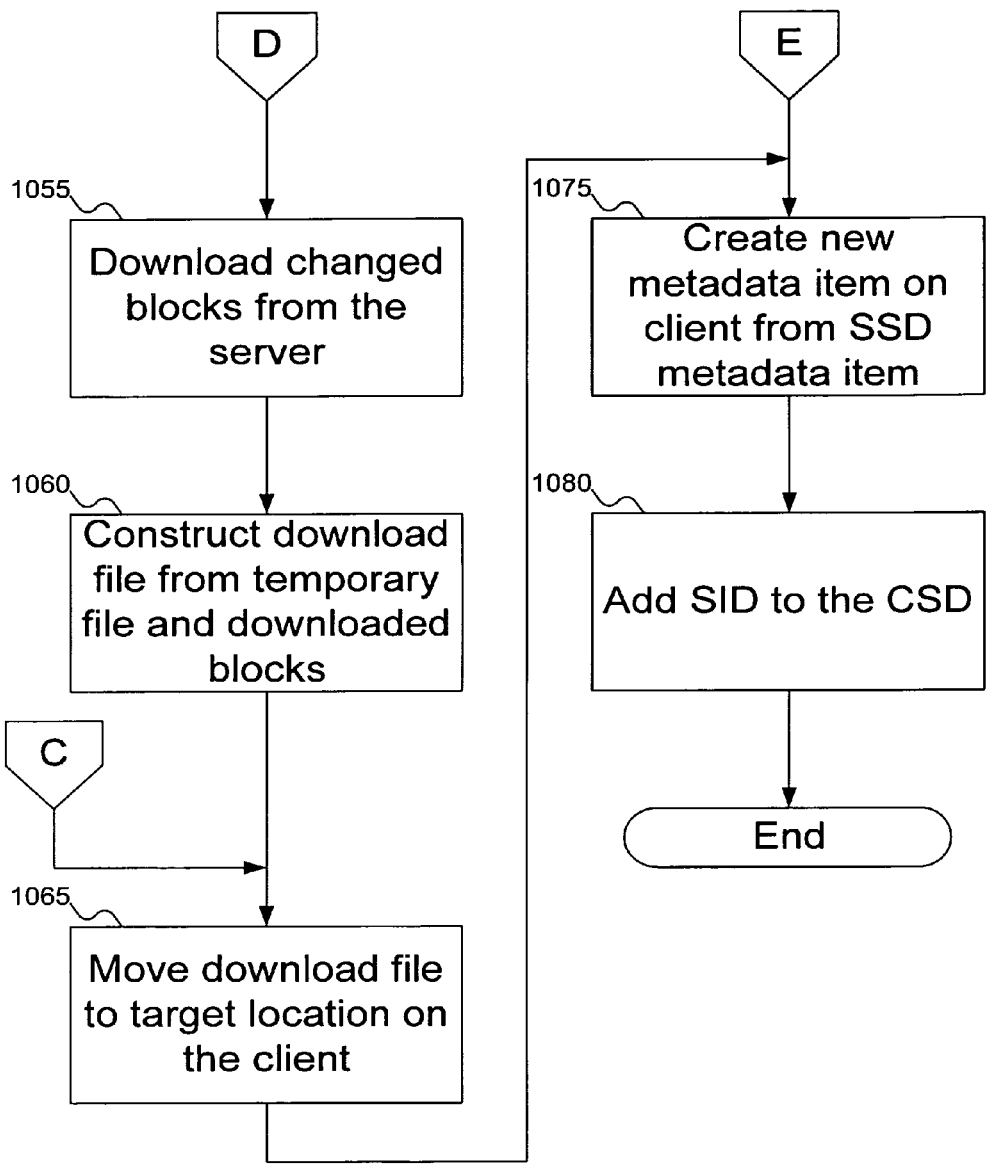
Figure 11A:
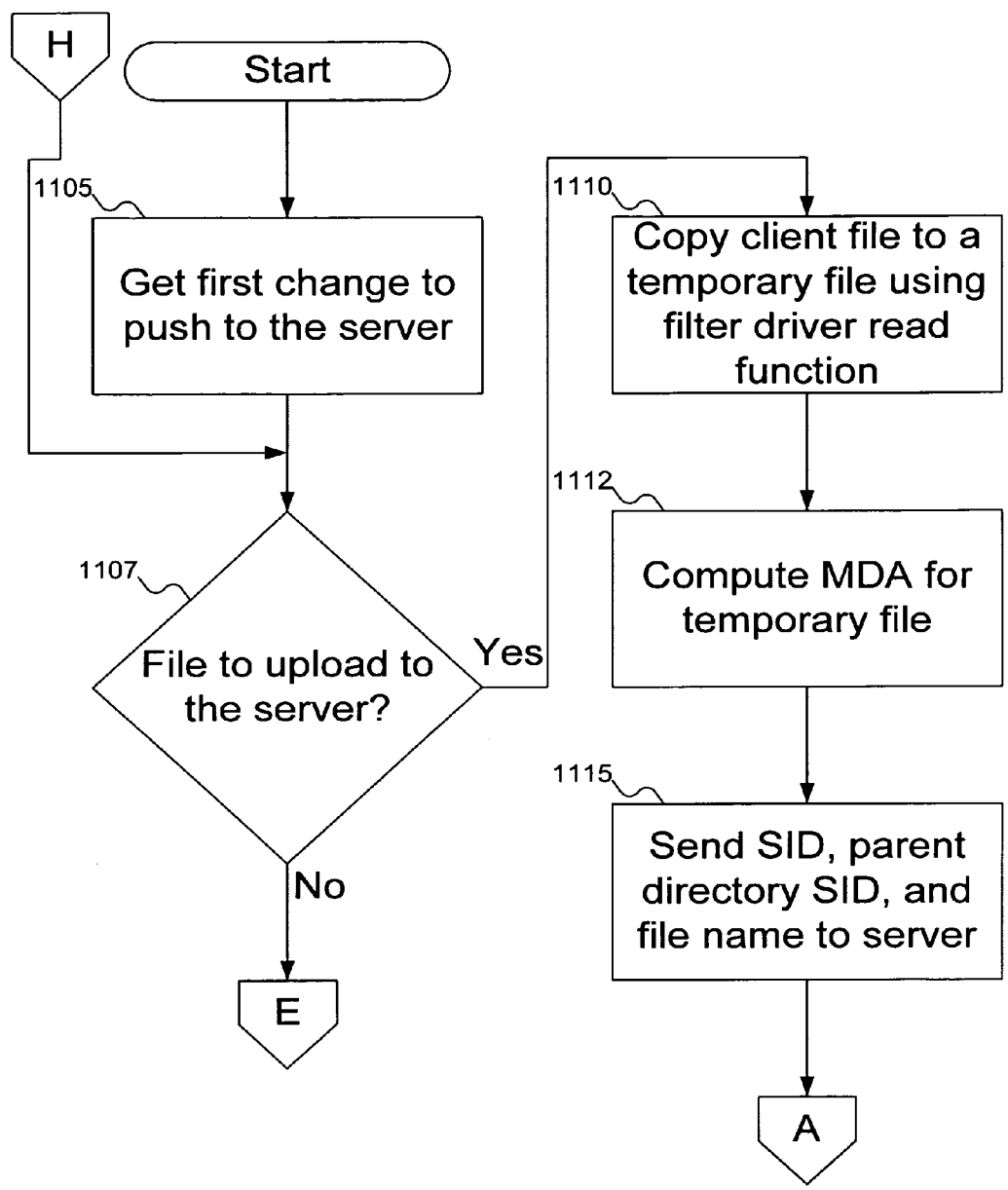
FIGS. 11A-11F show a flowchart of the procedure used to push changes to the server from a client of FIG. 1, according to an embodiment of the invention.
Figure 11B:
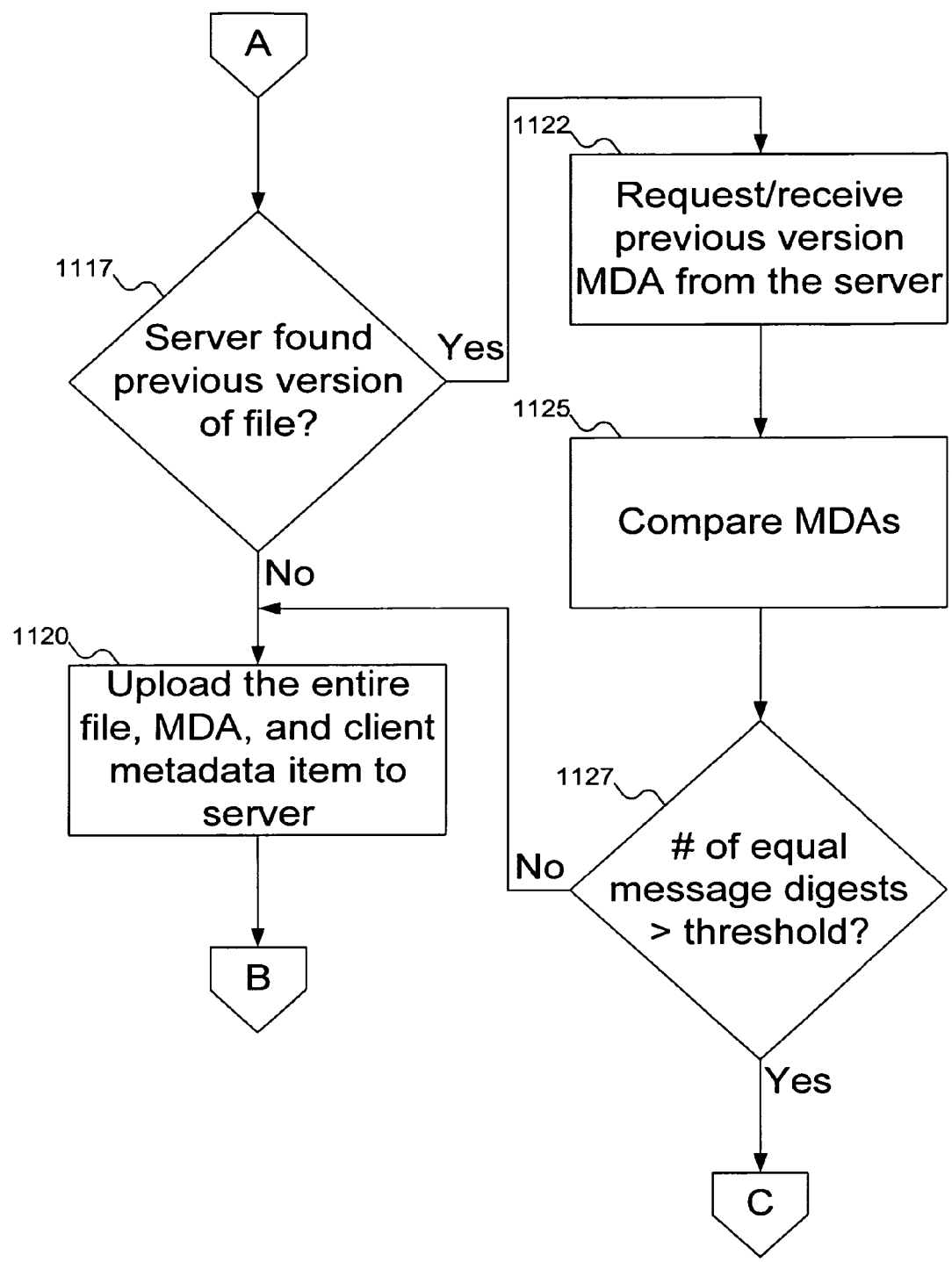
Figure 11C:
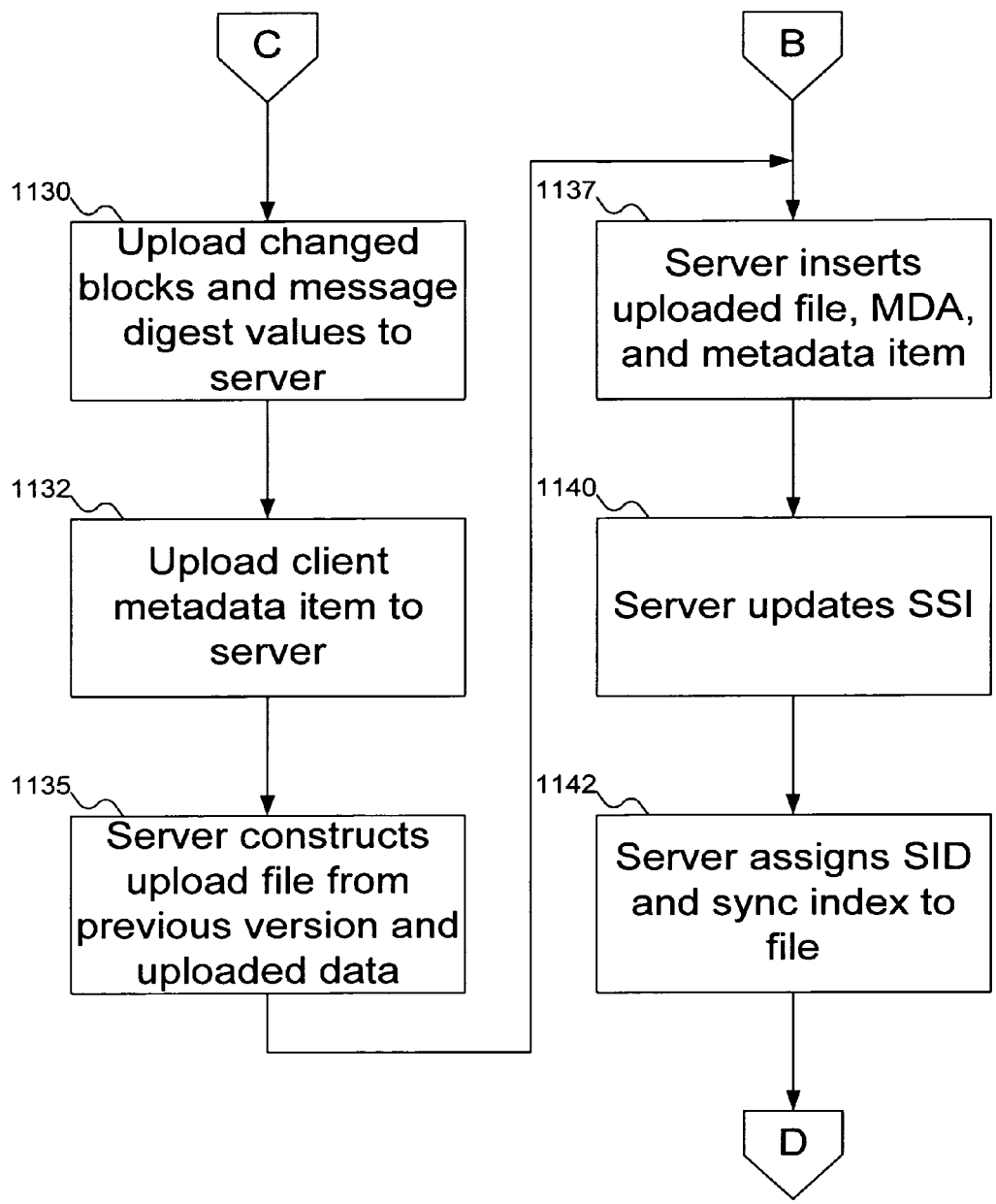
Figure 11D:
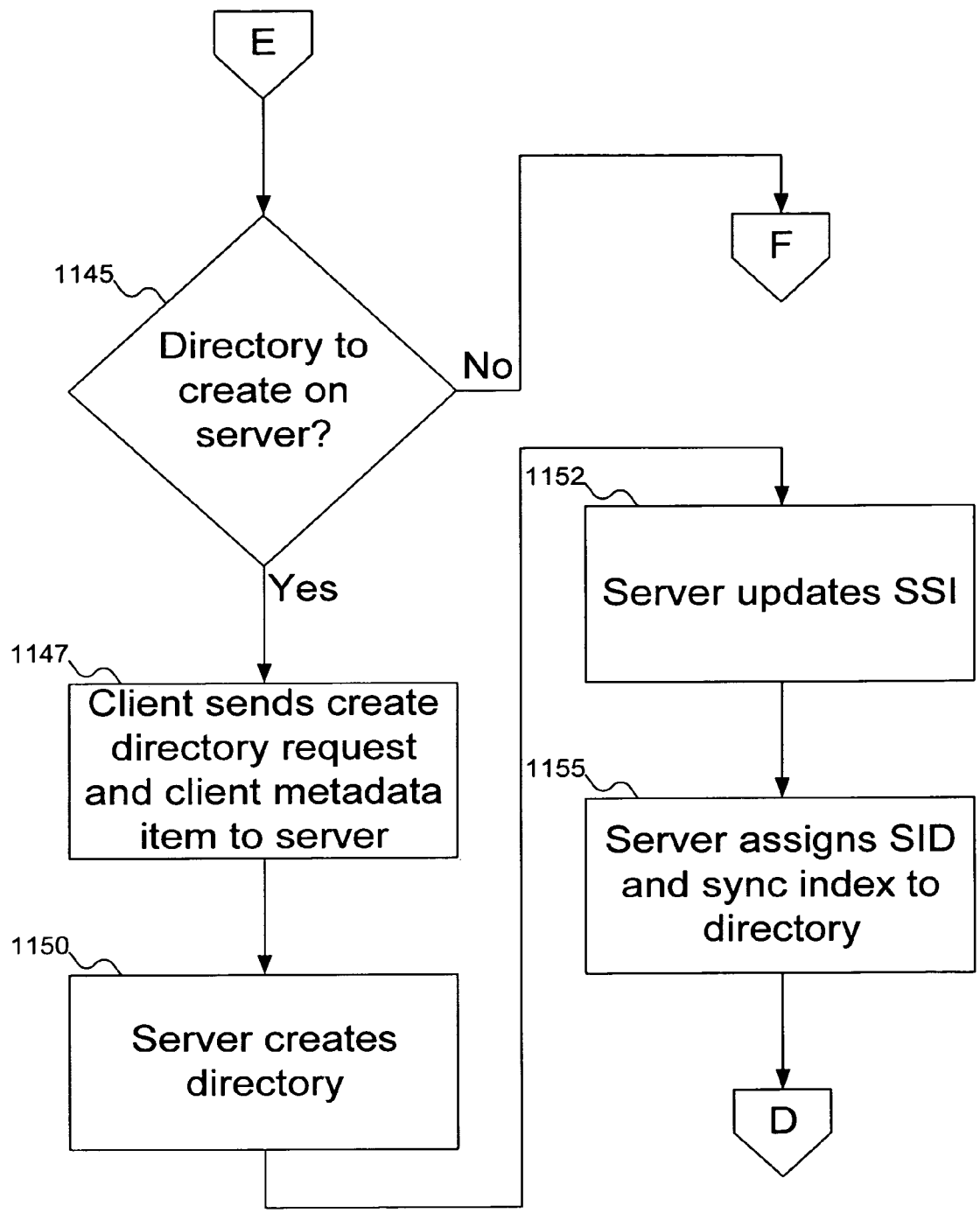
Figure 11E:
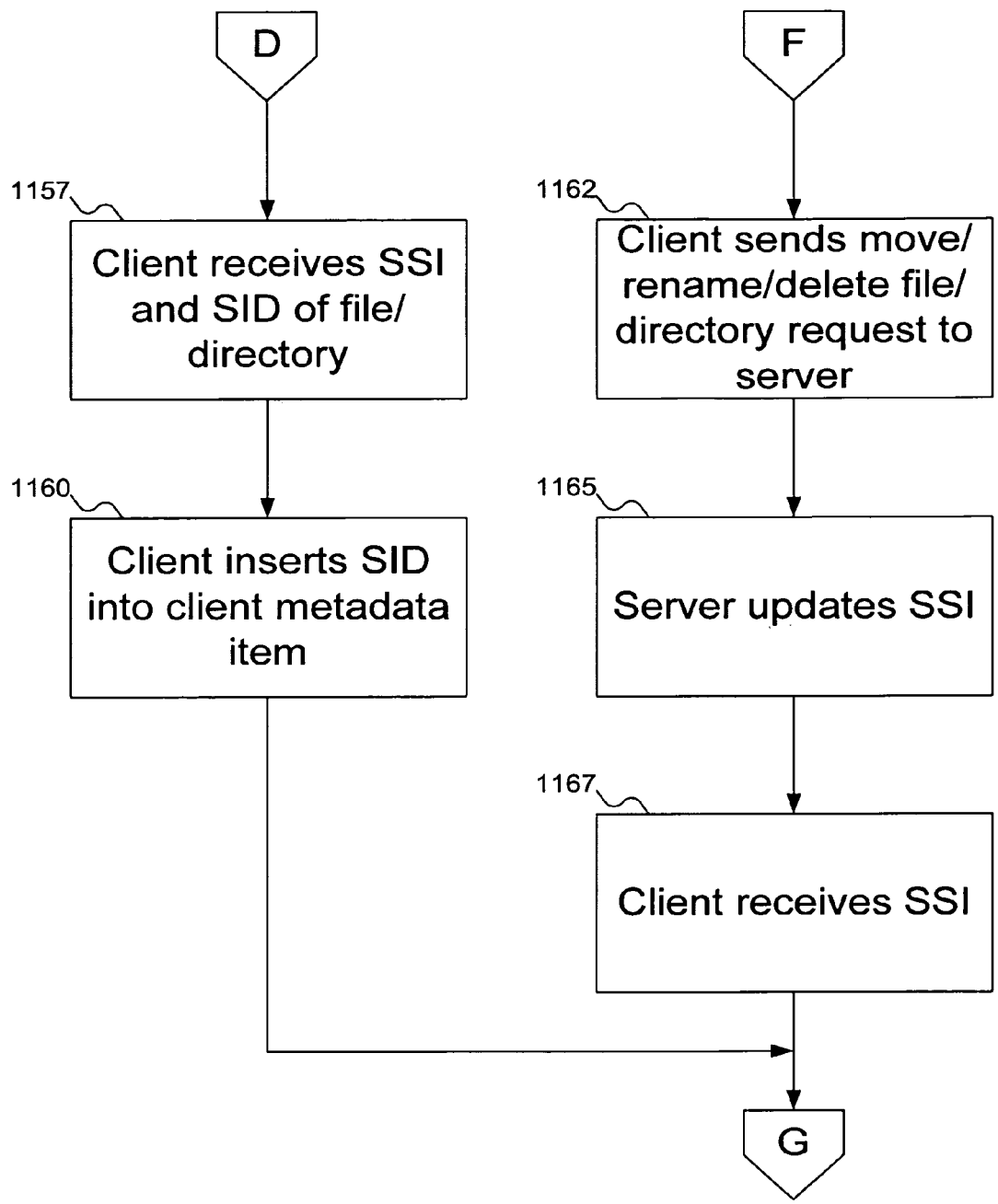
Figure 11F:
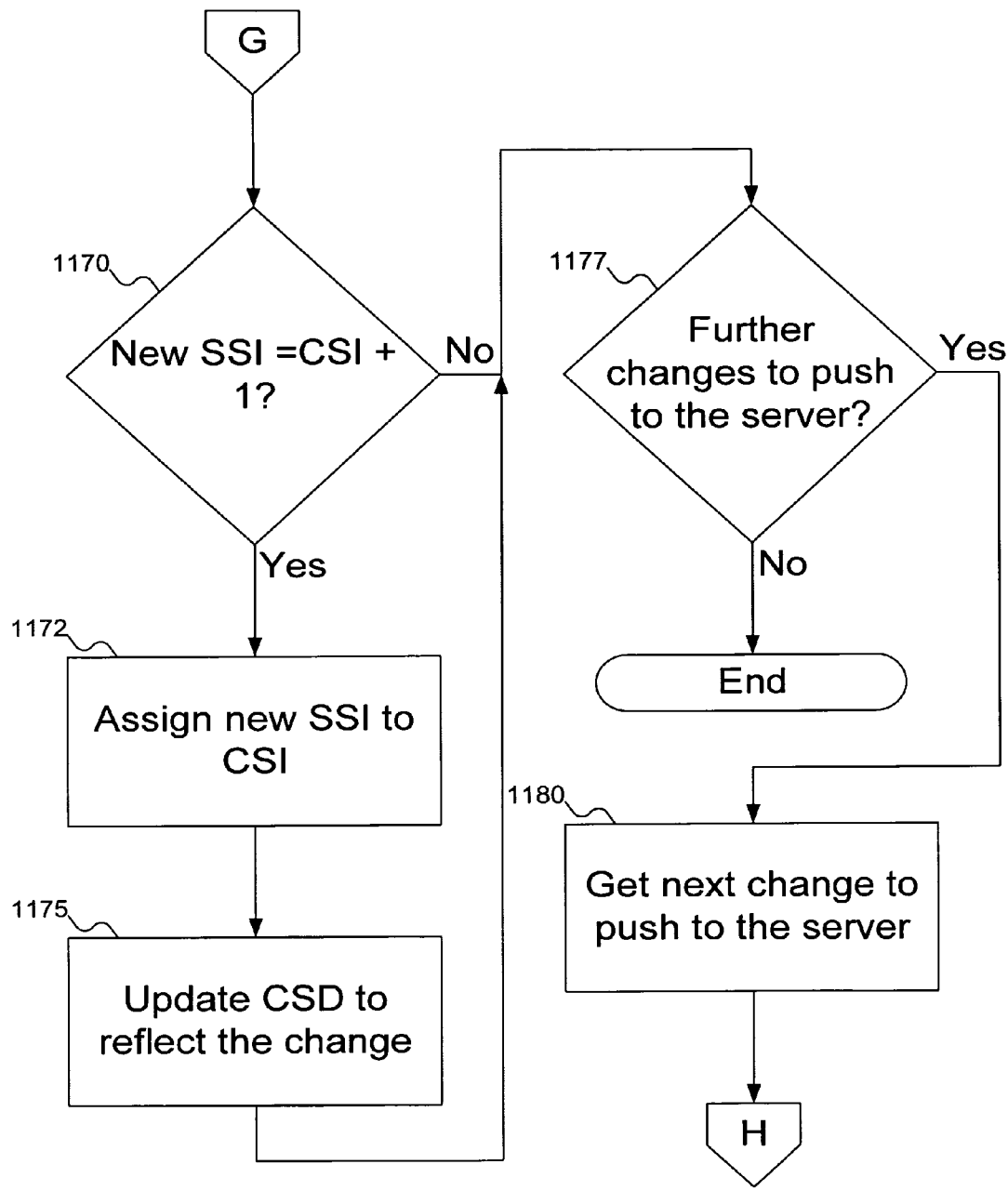

FIGS. 10A-10C show a flowchart of the procedure used to download files from the server to a client of FIG. 1, according to an embodiment of the invention. At step 1005, the client locates the SSD metadata item for the SID. At step 1010, the client determines if the item is a file. If the item is not a file, then at step 1012 the client creates the directory. Otherwise, if the client is a file, then at step 1015 the client uses the PFID, the parent directory SID, and the metadata item name to locate the file, if it can. At step 1020 the client checks to see if it was able to locate a previous version of the file.

If the client was able to locate a previous version of the file, then at step 1025 (FIG. 10B) the client copies the previous version of the file to a temporary file, using the filter driver read function. At step 1030, the client computes the MDA for the temporary file. At step 1035, the client retrieves the MDA for the file from the server. At step 1040, the client compares the received and computed MDAs. At step 1045, the client checks to see how many message digests in the compared MDAs matched. If an insufficient number of message digests matched between the compared MDAs, or if the client could not locate a previous version of the file at step 1020 (on FIG. 10A), then at step 1050 the client downloads the entire file.

But if a threshold number of message digests matched between the compared MDAs, then at step 1055 (FIG. 10C) the client requests and receives the changed blocks (as opposed to the entire file) from the server. At step 1060, the client constructs the download file from the temporary file and the received changed blocks. At step 1065, whether the client downloaded the entire file or only the changed blocks, the client moves the downloaded file to the directory in which it is to be stored.

At step 1075, whether the downloaded item was a file or a newly created directory, the client creates a new metadata item for the SID from the SSD metadata item. At step 1080, the client adds the SID to the CSD.

FIGS. 11A-11F show a flowchart of the procedure used to push changes to the server from a client of FIG. 1, according to an embodiment of the invention. At step 1105, the client gets the first change to push to the server. At step 1107, the client checks to see if the change is a file to upload to the server. If the change is a file to upload, then at step 1110 the client makes a temporary copy of the file, using the filter driver read function. At step 1112, the client computes the MDA for the temporary copy of the file. At step 1115, the client sends the SID, the parent directory SID, and the file name to the server.

At step 1117 (FIG. 11B), the server determines if a previous version of the file is on the server. If not, then at step 1120 the entire file, the MDA, and the client metadata item are uploaded to the server. If the server was able to locate a previous version of the file, then at step 1122 the client requests and receives the MDA of the previous version of the file. At step 1125, the client compares the received MDA with the MDA computed for the temporary copy of the file. At step 1127, the client determines if a threshold number of message digests match between the computed and received MDAs. If an insufficient number of message digests match between the received and computed MDAs, then the client returns to step 1120 and uploads the entire file.

If a threshold number of message digests match between the received and computed MDAs, then at step 1130 (FIG. 11C) the client uploads the changed blocks and message digest values to the server. At step 1132, the client uploads the client metadata item to the server. At step 1135, the server constructs the uploaded file from the previous version of the file and the received blocks.

At step 1137, whether the client performed a partial or full upload of the file, the server inserts the uploaded file, MDA, and metadata item into the server SFS database. At step 1140, the server updates the SSI, and at step 1142, the server assigns a SID and a sync index (the value of the SSI) to the file.

If the change to push to the server at step 1107 (on FIG. 11A) was not a file upload, then at step 1145 (FIG. 11D) the client checks to see if the change is to create a directory on the server. If so, then at step 1147 the client sends the directory create request and the client metadata item to the server. At step 1150, the server creates the directory. At step 1152, the server updates the SSI, and at step 1155 the server assigns a SID and a sync index (the value of the SSI) to the directory.

At step 1157 (FIG. 11E), whether the client was uploading a file to the server or creating a directory on the server, the client receives the SSI and the SID. At step 1160, the client inserts the SID into the client metadata item.

If the change to push to the server at steps 1107 and 1145 was neither a file to upload nor a directory to create, then the change was a move, rename, or delete operation. At step 1162, the client sends the move, rename, or delete instruction to the server. The server performs the operation. At step 1165 the server updates the SSI, and at step 1167 the client receives the SSI.

At step 1170 (FIG. 11F) regardless of what change the client pushed to the server, the client checks to see if the received SSI is the expected value. If the received SSI is equal to the CSI plus one, then no other client has been updating files or directories in the account. At step 1172, the client updates the CSI to reflect the new SSI, and at step 1175 the client updates the CSD to reflect the transmitted change. If the received SSI was greater than the CSI plus one, then another client must have made changes to the account. In that case, the client skips steps 1172 and 1175, so that on the next synchronization cycle the client will receive in the SSD the changes made relative to the current CSI.

At step 1177, the client checks to see if there are any further changes to push to the server. If there are, then at step 1180, the client gets the next change, and processing returns to step 1107 (on FIG. 11A) to upload the next change. Otherwise, if there are no further changes to push to the server, then the client is finished uploading changes.

Browser Access

An applet provides a browser-based access to a user's data on the server. In an embodiment of the invention, the applet does not perform synchronization; it simply allows the user to access his data from the browser without requiring the client SA. But a person skilled in the art will recognize that the applet can be implemented to perform synchronization with the client. The applet is preferably implemented in Java, but a person skilled in the art will recognize that tools other than Java can be used.

When the applet is launched it makes a sync poll call passing a CSI of zero to the server. The server SFS returns all of the metadata for the user's account. The applet processes this data, decrypting the name fields if the account is encrypted, and presents the server directory tree to the user. Using this information, the user can download files or make changes to the server much like the second (push) stage of client synchronization. Applet functions include file upload and download, create directory, and move, rename or delete files or directories in the server account. The applet also encrypts file data during file uploads and decrypts file data during file downloads if the account is encrypted.

Figure 12:
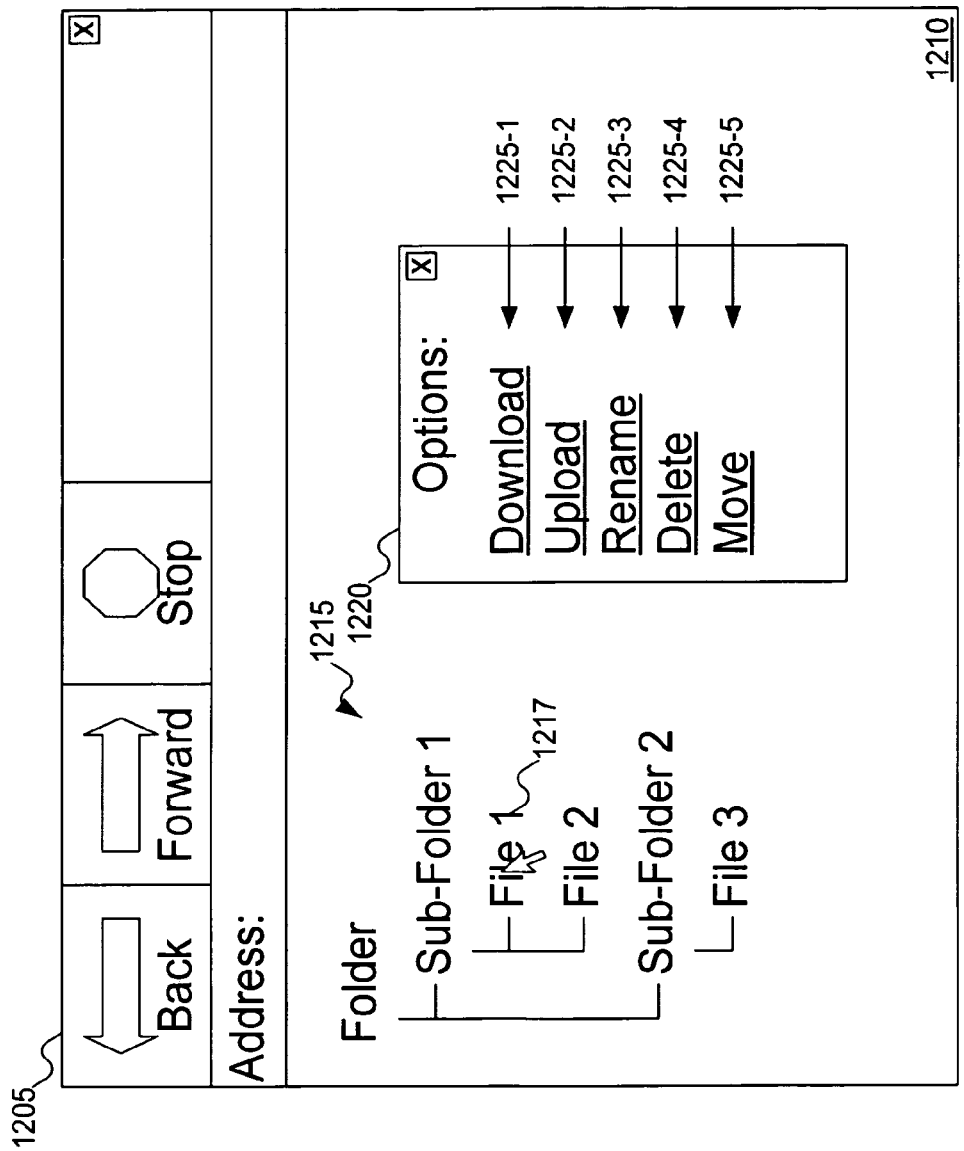
FIG. 12 shows an example of a browser running an applet displayed on a client of FIG. 1 used for downloading and uploading of files, and for directory maintenance, according to an embodiment of the invention.

FIG. 12 shows a browser running the applet displayed on a client of FIG. 1 used for downloading and uploading of files, and for directory maintenance, according to an embodiment of the invention. In FIG. 12, browser 1205 includes window 1210, in which directory structure 1215 is displayed. Directory structure 1215 includes three files organized into two directories, but a person skilled in the art will recognize that other directory structures are equally possible. By selecting a file or directory (a directory is considered a specialized type of file), the user can make changes. For example, in FIG. 12 the user has selected file 1217. Pop-up dialog box 1220 presents the user with options. Specifically, the user can download the file from the server to the client (option 1225-1), upload the file to the server from the client (option 1225-2), rename the file on the server (option 1225-3), delete the file on the server (option 1225-4), or move the file to a different directory on the server (option 1225-5).

There are typically two situations where the browser/applet combination is typically used. The first is where the client is a thin client, capable of running a browser and an applet, but not the full client SA. The second situation where the browser/applet is typically used is where the client is untrusted. For example, a user might need to show a file to another party, and wish to do so using the other party's computer (as might happen if the user does not bring a portable computer with him). If the user does not trust the other party, the user would not want to install the client software on the other party's computer. Doing so could give the other party access to the user's files.

By using the browser and applet of FIG. 12, a person skilled in the art will recognize how client access using an untrusted computer can be achieved. Most computers today include a browser with Java capability. By simply accessing the applet for his folder on the server, a user can access his files without effecting a full installation of the client on an untrusted computer.

An embodiment of the invention includes a library that provides direct access to server accounts, equivalent to the access given by the applet discussed above. This library can be used by middle tier applications to access account data and deliver it via HTML (HyperText Markup Language) to thin clients using a SSL connection.

Figure 13A:
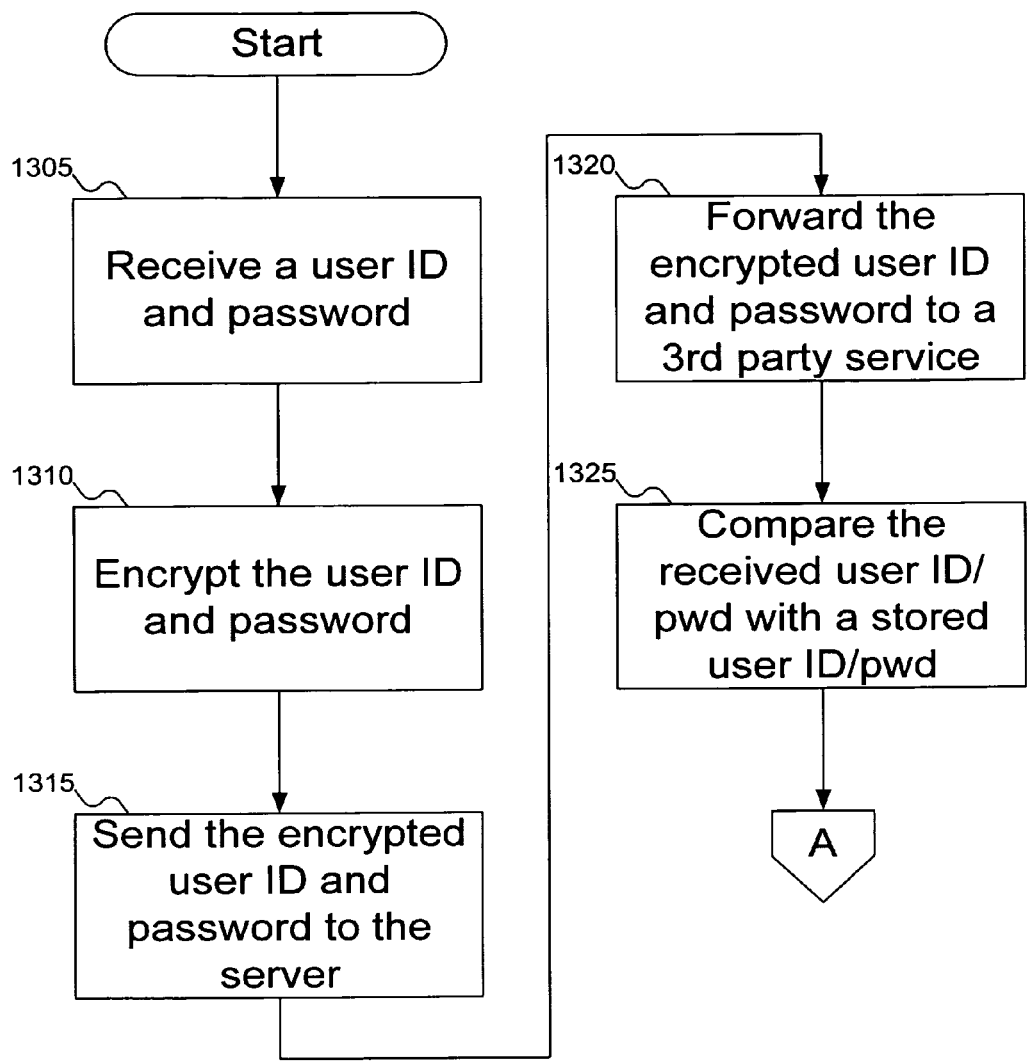
FIGS. 13A-13B show a flowchart for permitting or denying the clients of FIG. 1 access to the files on the server Synchronization File System of FIG. 1, according to an embodiment of the invention.
Figure 13B:
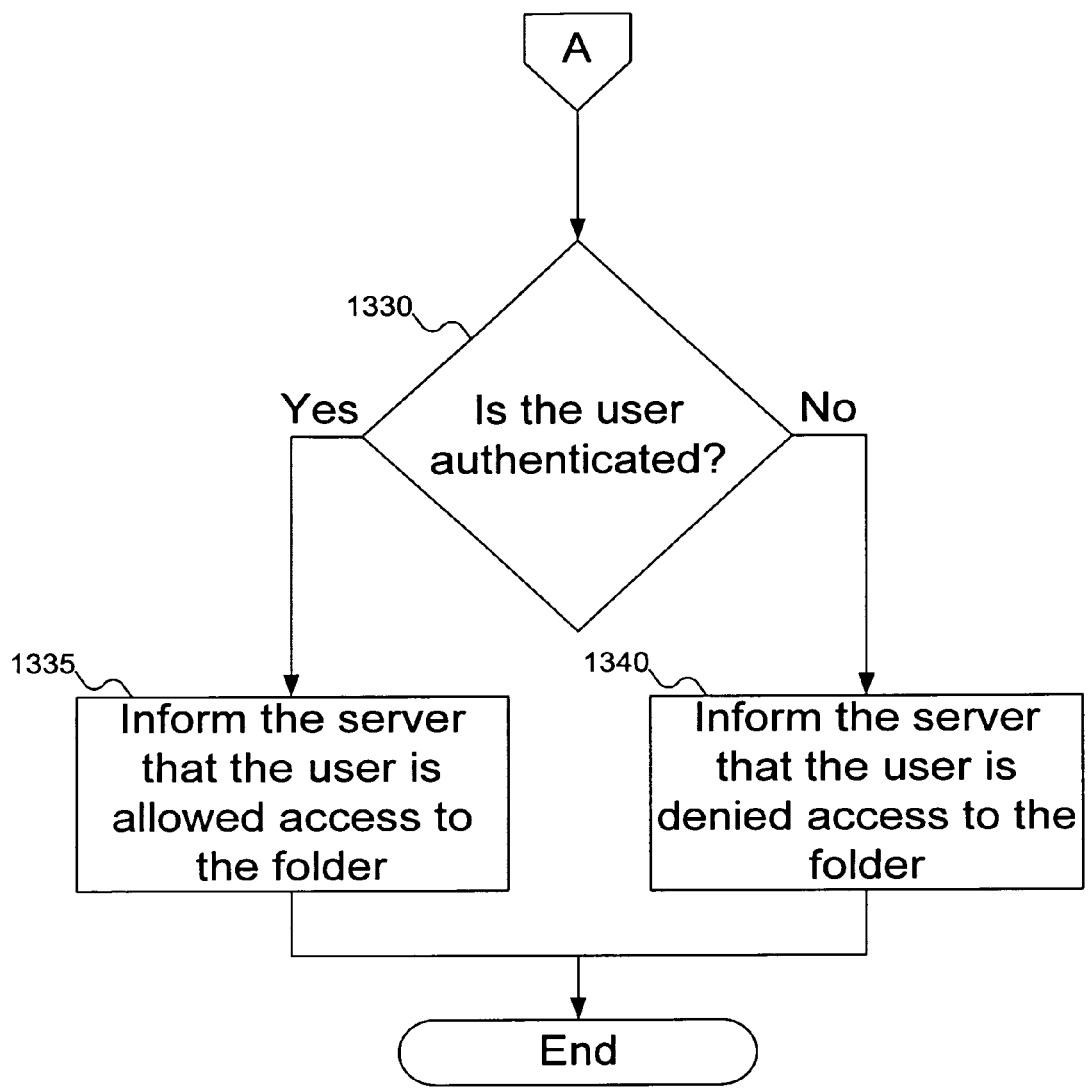

Three additional points not previously discussed are worth mentioning. The first is that before a server allows a user access to a folder for purposes of synchronization, the server can authenticate the user, to make sure that the user is authorized to access the folder. FIGS. 13A-13B show a flowchart of a procedure for permitting or denying the clients of FIG. 1 access to the files on the server of FIG. 1, according to an embodiment of the invention. In FIG. 13A, at step 1305, the user logs in to the system, providing his ID and password. This information is encrypted in step 1310, to protect the data from unauthorized access. At step 1315, the encrypted user ID and password are sent to the server. At step 1320, the encrypted user ID and password are forwarded to a third-party authentication service. Note that if the server does its own authentication, step 1320 can be skipped. At step 1325, the encrypted user ID and password are compared with the known user ID/password combinations to see if the encrypted user ID and password are recognized. At step 1330 (FIG. 13B), a decision is made. If the user is authorized, then at step 1335, the user is permitted to access the folder. Otherwise, at step 1340, the user is denied access to the folder.

Although the procedure shown in FIGS. 13A-13B authenticates a user before permitting access to the folder on the server, a person skilled in the art will recognize that authenticating a user is not needed while a user is making changes locally on a client. The filter drivers can track changes made locally, even while disconnected from the server. The user can later log in to the server and be authenticated, at which point changes can be migrated to the server. Thus, the steps of FIGS. 13A-13B are not a prerequisite to using the folder on the client.

The second point is that in some environments, the data on the server can be encrypted but the user of the folder not trusted to reveal his encryption key if needed. For example, consider a business environment, where users are employees of the company. For security reasons, the company wants the data in the synchronization folder to be encrypted. But what if the employee leaves without revealing his encryption key? Then the data is lost to the company. The solution is to use a key escrow service.

Figure 14:
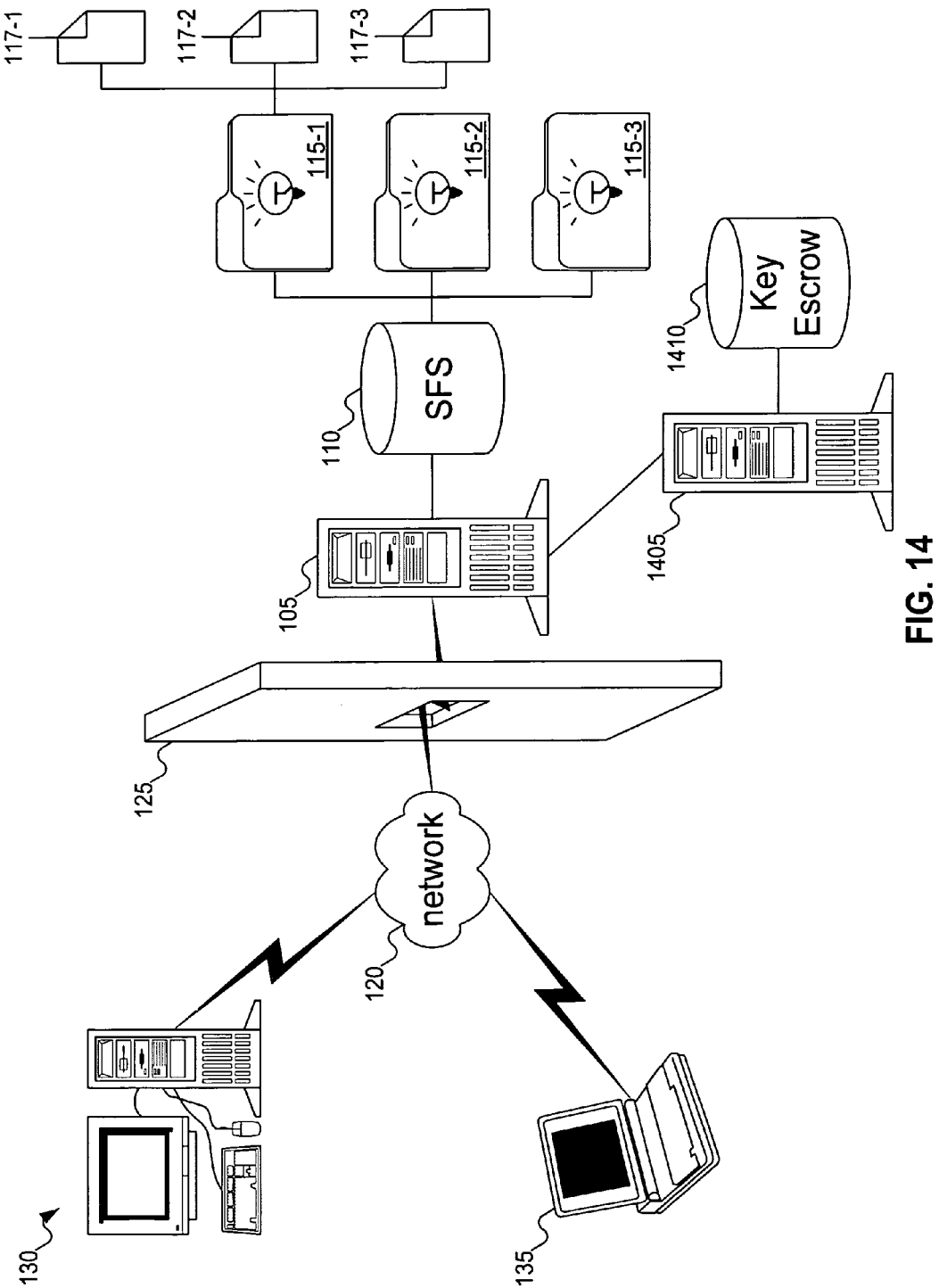
FIG. 14 shows the clients and server of FIG. 1, the server using a key escrow server, according to an embodiment of the invention.

FIG. 14 shows the clients and server of FIG. 1, the server using a key escrow server, according to an embodiment of the invention. In FIG. 14, server 105 is connected to key escrow server 1405, which includes key escrow database 1410. Key escrow database 1410 stores encryption keys used by the clients to encrypt the data stored in folders 115-1, 115-2, and 115-3. If the clients lose the keys (for example, the users forget the keys, or choose not to reveal the keys to the appropriate parties upon request), the encryption keys can be recovered from key escrow database 1410 upon the showing of the appropriate authority.

The third point is that network administration is not complicated. Although a network administrator might not be able to determine to which user a particular file belongs, the network administrator has tools that make database maintenance simple. For example, the network administrator can move a user's folder from one server to another, by specifying the user's name. The appropriate identifier for the user can be determined, and the database (preferably not directly readable by the network administrator) can be read to determine which files belong to that user. The identified files can then be moved to another server, without any of the contents, file names, or directory structure being visible to the network administrator. And, except for the change in server to which the user must log in, the move can be completely transparent to the user.

The network administrator can also set policies. A policy is a rule that controls operation of the folder by the user. For example, a network administrator can set a policy that caps folder size for users at five megabytes. Policies can be set globally (i.e., applying to all user accounts), in groups (to a coordinated set of user accounts) or individually (to a specific user account). Individual user policies override group policies, which in turn override global policies. Preferably, overriding policies do not contradict more general policies. For example, a network administrator can set a global policy that data be encrypted by the clients, and then set an individual policy for certain users requiring key escrow of the encryption keys. But the network administrator should not be permitted to set a global policy requiring encryption, then set a policy permitting certain users to store files in cleartext. However, in an alternative embodiment of the invention, more specific policies can contradict more default policies.

Having illustrated and described the principles of our invention in an embodiment thereof, it should be readily apparent to those skilled in the art that the invention can be modified in arrangement and detail without departing from such principles. We claim all modifications coming within the spirit and scope of the accompanying claims.

GLOSSARY

CID: Client ID
CSD: Client Sync Data
CSI: Client Sync Index
DSI: Directory Sync Index
FSI: File Sync Index
HTML: HyperText Markup Language
HTTP: HyperText Transport Protocol
MDA: Message Digest Array
PDA: Personal Digital Assistant
PFID: Previous Version File ID
SA: Synchronization Application
SFS: Synchronization File System
SI: Sync Index
SID: Server ID
SSD: Server Sync Data
SSI: Server Sync Index
SSL: Secure Sockets Layer
TCP/IP: Transmission Control Protocol/Internet Protocol

The invention claimed is:

1. A synchronization file system installed on a server for synchronizing a first user account on the server with a second user account on a client, comprising:

a server sync index (SSI) for the first user account, the SSI identifying the current state of the first user account on the server;

a first directory entry for a file system directory in the first user account, including a first metadata item containing a directory sync index (DSI), the DSI identifying the last change to the file system directory or to an object within the file system directory;

a second directory entry for a file in the first user account, including a second metadata item containing a file sync index (FSI), the FSI identifying the last change to the file; and means for assigning a server ID (SID) to at least one of the first metadata item for the first directory entry and the second metadata item for the second directory entry.

2. A synchronization file system according to claim 1, further comprising means for updating the SSI when a change occurs to the first directory entry.

3. A synchronization file system according to claim 1, further comprising means for storing a change time to the metadata item for the first directory entry.

4. A synchronization file system according to claim 1, further comprising means for assigning a previous version file ID (PFID) to the second metadata item.

5. A synchronization file system according to claim 1, wherein:

the second directory entry includes a name; and the synchronization file system further comprises means for storing an encrypted version of the name in the metadata item for the second directory entry.

6. A synchronization file system according to claim 1, further comprising means for storing an encrypted version of the file.

7. A synchronization file system according to claim 1, wherein:

the file includes a message digest array (MDA), the MDA supporting identification of at least a portion of the file that has changed; and the synchronization file system further comprises means for storing the MDA.

8. A synchronization file system according to claim 7, wherein the means for storing includes means for storing the MDA with the file.

9. A synchronization file system according to claim 7, wherein the means for storing includes means for storing the MDA in the second metadata item.

10. A synchronization file system according to claim 1, further comprising means for generating a server sync data (SSD).

11. A synchronization file system according to claim 10, wherein the for generating includes means for generating a SSD responsive to a client sync index (CSI), the CSI identifying the current state of the second user account on the client.

12. A synchronization file system installed on a server for synchronizing a first user account on the synchronization file system with a second user account on a client, comprising:

a file system directory in the first user account in the synchronization file system;

a server ID assigned to the file system directory;

a directory sync index (DSI) assigned to the file system directory, the DSI identifying the last change to the file system directory or to an object within the file system directory;

a file in the file system directory of the first user account;

a file sync index (FSI) assigned to the file, the FSI identifying the last change to the file; and a server sync index (SSI) for the first user account, the SSI identifying the current state of the first user account.

13. A synchronization file system according to claim 12, further comprising a metadata item for the directory storing the server ID assigned to the file system directory.

14. A synchronization file system according to claim 13, wherein the metadata item for the file system directory further stores the directory sync index assigned to the file system directory.

15. A synchronization file system according to claim 13, wherein the metadata item for the file system directory further stores a change time assigned to the file system directory.

16. A synchronization file system according to claim 13, wherein:

the file system directory includes a name; and the metadata item for the file system directory further stores an encrypted name assigned to the file system directory.

17. A synchronization file system according to claim 12, further comprising a second server ID assigned to the file.

18. A synchronization file system according to claim 17, further comprising a metadata item for the file storing the second server ID assigned to the file and the FSI assigned to the file.

19. A synchronization file system according to claim 18, wherein the metadata item for the file further stores a previous version file ID (PFID) assigned to the file.

20. A synchronization file system according to claim 18, wherein the metadata item for the file further stores a change time assigned to the file.

21. A synchronization file system according to claim 18, wherein:

the file includes a name; and the metadata item for the file further stores an encrypted name assigned to the file.

22. A synchronization file system according to claim 17, wherein the file is an encrypted file.

23. A synchronization file system according to claim 17, further comprising a message digest array (MDA), the MDA supporting identification of at least a portion of the file that has changed.

24. A synchronization file system according to claim 23, wherein the MDA is stored with the file.

25. A synchronization file system according to claim 23, wherein the MDA is stored in a metadata item for the file.

26. A synchronization file system according to claim 12, further comprising a server sync data (SSD).

27. A synchronization file system according to claim 12, further comprising:

a first metadata item for the file system directory to store the DSI; and a second metadata item for the file to store the FSI.

28. A method for a synchronization file system of a server to synchronize a first user account on the synchronization file system with a second user account on a client, comprising:

receiving a client sync index (CSI) from the client, the CSI identifying the current state of the second user account on the client;

transmitting a server sync index (SSI) to the client, the SSI identifying the current state of the first user account on the synchronization file system;

using the CSI and the SSI to determine whether the server and client are synchronized; and if the server and client are not synchronized:

generating a server sync data (SSD), the SSD including the SSI and a directory sync index (DSI), the DSI identifying the last change to a file system directory in the first user account or to an object within the file system directory; and transmitting the SSD to the client.

29. A method according to claim 28, further comprising:
receiving a request from the client for a file;
transmitting the file to the client.

30. A method according to claim 29, wherein:
receiving a request includes receiving a request for a message digest array (MDA) for the file, the MDA supporting identification of at least a portion of the file that has changed and
transmitting the file includes transmitting the MDA to the client.

31. A method according to claim 30, wherein:
receiving a request includes receiving a request from the client for a block of the file; and
transmitting the file includes transmitting the block of the file to the client.

32. A method according to claim 28, wherein generating a server sync data (SSD) includes generating the server sync data (SSD), the SSD including the SSI, a directory sync index (DSI), and a file sync index (FSI), the FSI identifying the last change to a file in the first user account.

33. A method for a synchronization file system (SFS) of a server to synchronize a first user account on the synchronization file system with a second user account on a client, comprising:
receiving an instruction from the client to update a first directory entry and a second directory entry;
performing the instruction;
updating a server sync index (SSI), the SSI identifying the current state of the first user account on the synchronization file system;
updating a directory sync index (DSI) for the first directory entry, the DSI identifying the last change to the file system directory on the synchronization file system or to an object within the file system directory;
updating a file sync index (FSI) for the second directory entry, the FSI identifying the last change to the file; and
transmitting the updated SSI, the updated DSI, and the updated FSI to the client.

34. A method according to claim 33, further comprising the synchronization file system assigning the SSI to a metadata item.

35. A method according to claim 33, wherein:
receiving an instruction includes receiving a metadata item from the client; and
performing the instruction includes adding the metadata item to a server SFS database.

36. A method according to claim 33, wherein performing the instruction includes modifying a metadata item.

37. A method according to claim 33, wherein performing an instruction includes:
creating a third directory in the first directory;
assigning a server ID (SID) to the third directory; and
transmitting the SID for the third directory to the client.

38. A method according to claim 37, wherein assigning a server ID (SID) to the third directory includes storing the SID in a metadata item for the third directory.

39. A method according to claim 33, wherein performing an instruction includes:
receiving a file from the client;
adding the file into a server SFS database;
assigning a server ID (SID) to the file; and
transmitting the SID for the file to the client.

40. A method according to claim 39, wherein receiving a file includes:
copying the file to a temporary file;
receiving a block of the file;
incorporating the block into the temporary copy of the file; and
adding the temporary copy of the file into a server SFS database.

41. Computer-readable media containing a program for a synchronization file system of a server to synchronize a first user account on the synchronization file system with a second user account on a client, comprising:
software for receiving a client sync index (CSI) from the client, the CSI identifying the current state of the second user account on the client;
software for transmitting a server sync index (SSI) to the client, the SSI identifying the current state of the first user account on the synchronization file system;
software for using the CSI and SSI to determine whether the server and client are synchronized; and
if the server and client are not synchronized:
software for generating a server sync data (SSD), the SSD including the SSI and a directory sync index (DSI), the DSI identifying the last change to a file system directory in the first user account or to an object within the file system directory; and
software for transmitting the SSD to the client.

42. Computer-readable media containing a program for a synchronization file system of a server to synchronize a first user account on the synchronization file system with a second user account on a client, comprising:
software for receiving an instruction from the client to update a first directory entry and a second directory entry;
software for performing the instruction;
software for updating a server sync index (SSI), the SSI identifying the current state of the first user account on the synchronization file system;
software for updating a directory sync index (DSI) for the first directory entry, the DSI identifying the last change to the file system directory on the synchronization file system or to an object within the file system directory;
software for updating a file sync index (FSI) for the second directory entry, the FSI identifying the last change to the file; and
software for transmitting the updated SSI, the updated DSI, and the updated FSI to the client.

* * * * *

UNITED STATES PATENT AND TRADEMARK OFFICE
CERTIFICATE OF CORRECTION

| | |
|---|---|
| PATENT NO. | : 7,657,517 B2 |
| APPLICATION NO. | : 11/327742 |
| DATED | : February 2, 2010 |
| INVENTOR(S) | : David K. Brown et al. |

It is certified that error appears in the above-identified patent and that said Letters Patent is hereby corrected as shown below:

Column 19, line 52, the word "the" should read -- the means --.

Signed and Sealed this

Tenth Day of August, 2010

David J. Kappos
*Director of the United States Patent and Trademark Office*